(12) United States Patent
Ohnishi et al.

(10) Patent No.: US 9,513,169 B2
(45) Date of Patent: Dec. 6, 2016

(54) DISPLAY CALIBRATION SYSTEM AND STORAGE MEDIUM

(71) Applicant: SHARP KABUSHIKI KAISHA, Osaka-shi, Osaka (JP)

(72) Inventors: Hideki Ohnishi, Osaka (JP); Terumitsu Katougi, Osaka (JP); Makoto Hayasaki, Osaka (JP); Gaku Furuichi, Osaka (JP); Yasushi Adachi, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 41 days.

(21) Appl. No.: 14/564,329

(22) Filed: Dec. 9, 2014

(65) Prior Publication Data

US 2015/0213771 A1 Jul. 30, 2015

(30) Foreign Application Priority Data

Jan. 30, 2014 (JP) ................. 2014-016031

(51) Int. Cl.
*G09G 3/36* (2006.01)
*G01J 3/46* (2006.01)
*G09G 3/00* (2006.01)

(52) U.S. Cl.
CPC ............... *G01J 3/46* (2013.01); *G09G 3/006* (2013.01); *G09G 3/3648* (2013.01);
(Continued)

(58) Field of Classification Search
CPC ............ G09G 3/3607; G09G 2320/0693; G09G 2320/0666; G09G 2340/06; G09G 3/3648; G09G 3/006; G09G 2320/0673; G09G 2300/04; G09G 2320/0285; G01J 3/46
See application file for complete search history.

(56) References Cited

U.S. PATENT DOCUMENTS 6,466,693 B1 * 10/2002 Otsu .................. G06K 9/38
358/466
7,447,379 B2 * 11/2008 Choe .................. G06T 5/008
382/167
(Continued)

FOREIGN PATENT DOCUMENTS

| JP | 2003-46751 A | 2/2003 |
| JP | 2006-162728 A | 6/2006 |
| JP | 2013-44959 A | 3/2013 |

*Primary Examiner* — Md Saiful A Siddiqui
(74) *Attorney, Agent, or Firm* — Birch, Stewart, Kolasch & Birch, LLP

(57) ABSTRACT

A display calibration system includes: a display section subject to calibration; a correction data outputting section configured to perform a calibration process to determine, for each of the pixels of the display section, correction data for non-uniformity correction; and a first storage section configured to store reference data to be used in the calibration process. The reference data represents, for individual color patches of a first predetermined number, correspondences between RGB values and reference values. The correction data outputting section obtains, on a basis of the reference data and the measurement values of the color patches of a second predetermined number that is less than the first predetermined number, the pieces of correction data with respect to RGB values of the individual color patches of the predetermined second number. With this arrangement, it is possible to shorten a processing time of the calibration process.

2 Claims, 26 Drawing Sheets

(52) U.S. Cl.
CPC . *G09G 2300/04* (2013.01); *G09G 2320/0285* (2013.01); *G09G 2320/0666* (2013.01); *G09G 2320/0673* (2013.01); *G09G 2320/0693* (2013.01)

(56) References Cited

U.S. PATENT DOCUMENTS

| | | | | |
|---|---|---|---|---|
| 2004/0234153 | A1* | 11/2004 | Nakami | G06T 5/009 382/254 |
| 2007/0081721 | A1* | 4/2007 | Xiao | G06T 5/009 382/167 |
| 2009/0232089 | A1* | 9/2009 | Lott | H04W 36/0055 370/331 |
| 2011/0222767 | A1* | 9/2011 | Mitsunaga | H04N 1/6027 382/169 |
| 2012/0288195 | A1* | 11/2012 | Lings | G01J 3/0264 382/167 |
| 2013/0147860 | A1* | 6/2013 | Ishida | G09G 5/10 345/690 |

* cited by examiner

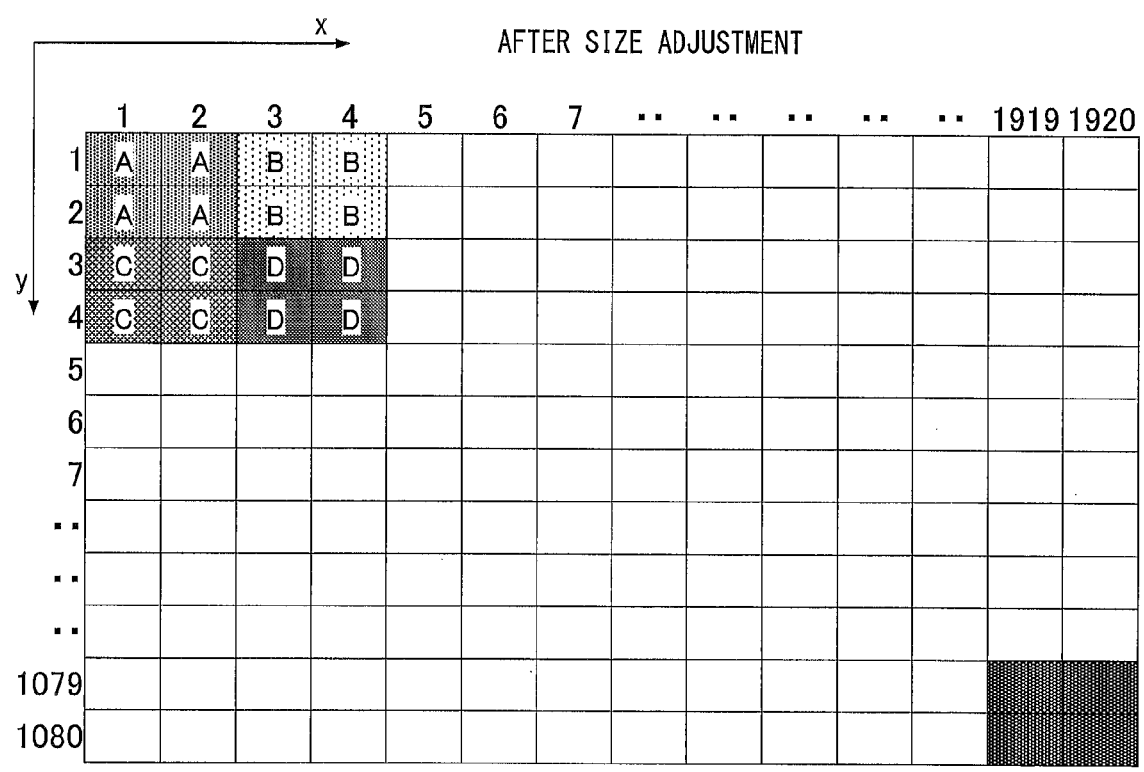

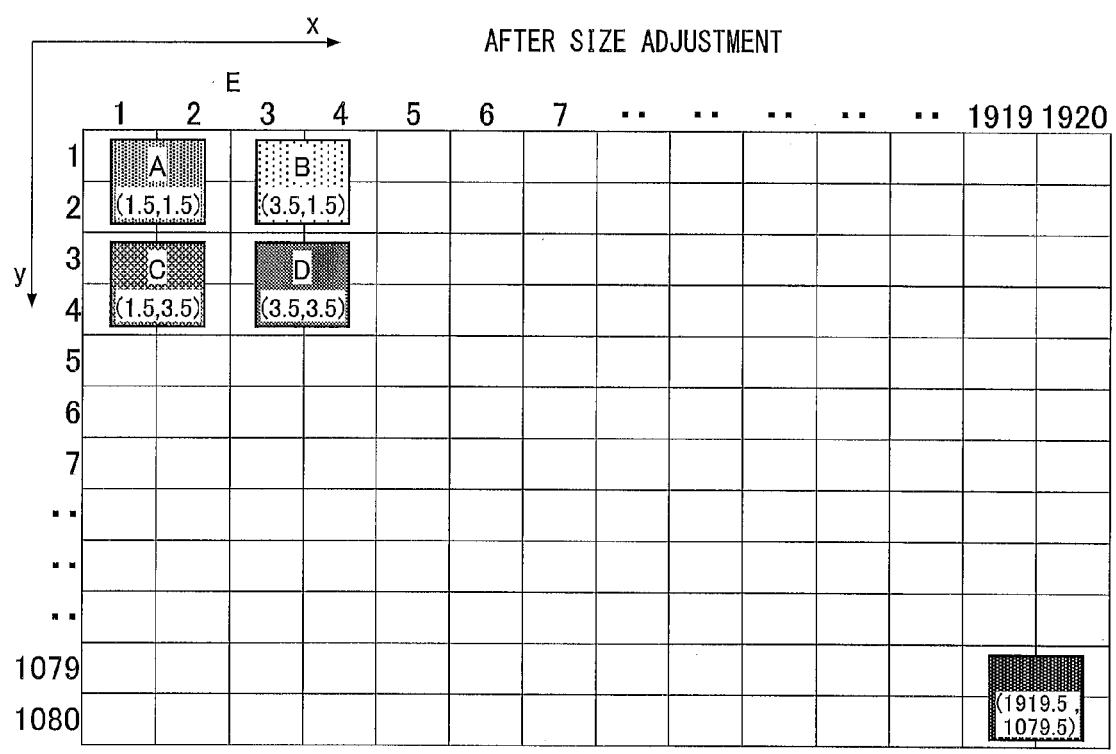

FIG. 5

|  | R | G | B | X | Y | Z |
|---|---|---|---|---|---|---|
| 1 | 0 | 0 | 0 | 0.904 | 0.716 | 1.899 |
| 2 | 0 | 0 | 32 | 3.023 | 1.262 | 12.83 |
| 3 | 0 | 0 | 64 | 9.536 | 2.954 | 45.4 |
| 4 | 0 | 0 | 96 | 25.35 | 7.178 | 126 |
| 5 | 0 | 0 | 128 | 49.62 | 13.92 | 248.7 |
| 6 | 0 | 0 | 160 | 80.09 | 22.74 | 402.6 |
| 7 | 0 | 0 | 192 | 118.7 | 34.69 | 597.4 |
| 8 | 0 | 0 | 224 | 161.2 | 48.55 | 810.9 |
| 9 | 0 | 0 | 255 | 208.7 | 63.8 | 1050 |
| 10 | 0 | 32 | 0 | 3.197 | 6.138 | 2.35 |
| 11 | 0 | 32 | 32 | 5.371 | 6.708 | 13.33 |
| 12 | 0 | 32 | 64 | 11.83 | 8.386 | 45.93 |
| 13 | 0 | 32 | 96 | 27.7 | 12.63 | 126.5 |
| 724 | 255 | 255 | 96 | 536.5 | 667.7 | 172.5 |
| 725 | 255 | 255 | 128 | 560.7 | 674.3 | 295.1 |
| 726 | 255 | 255 | 160 | 590.8 | 683.2 | 447.7 |
| 727 | 255 | 255 | 192 | 629.1 | 694.9 | 640.4 |
| 728 | 255 | 255 | 224 | 671.4 | 708.7 | 852.9 |
| 729 | 255 | 255 | 255 | 718.2 | 723.7 | 1089 |

FIG. 7B
|  | R | G | B | X | Y | Z |
|---|---|---|---|---|---|---|
| 1 | 0 | 0 | 0 | 0.904 | 0.716 | 1.899 |
| | | |  | | | |
| 547 | 192 | 192 | 192 | 405.7 | 406.8 | 620.1 |
| 548 | 192 | 192 | 224 | 447.4 | 420.4 | 830.2 |
| 549 | 192 | 192 | 255 | 493.5 | 435.2 | 1063 |
| | | | 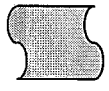 | | | |
| 556 | 192 | 224 | 192 | 455.4 | 516.8 | 629.2 |
| 557 | 192 | 224 | 224 | 497.1 | 530.3 | 839.2 |
| 558 | 192 | 224 | 255 | 543.1 | 545.1 | 1071 |
| | | |  | | | |
| 628 | 224 | 192 | 192 | 463.5 | 435.6 | 620.1 |
| 629 | 224 | 192 | 224 | 505 | 449.2 | 830.1 |
| 630 | 224 | 192 | 255 | 551.2 | 463.9 | 1062 |
| | | | 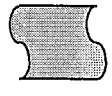 | | | |
| 637 | 224 | 224 | 192 | 515.8 | 548.4 | 631.7 |
| 638 | 224 | 224 | 224 | 557.9 | 562.1 | 843.3 |
| 639 | 224 | 224 | 255 | 604.4 | 577 | 1078 |
| | | |  | | | |
| 729 | 255 | 255 | 255 | 718.2 | 723.7 | 1089 |

| | 1ST | | | 2ND | | | | | | | | 27TH | | |
|---|---|---|---|---|---|---|---|---|---|---|---|---|---|---|
| | R | G | B | R | G | B | | | | | | R | G | B |
| | (0 | 0 | 0) | (0 | 0 | 128) | ·· | ·· | ·· | ·· | ·· | (255 | 255 | 255) |
| ADJUSTMENT VALUE | 1 | 0 | 1 | 0 | 2 | −3 | | | | | | 0 | 0 | 0 |

FIG. 12

|  | 1ST | | | 2ND | | | .. | .. | .. | .. | .. | .. | 27TH | | |
|---|---|---|---|---|---|---|---|---|---|---|---|---|---|---|---|
|  | R | G | B | R | G | B | | | | | | | R | G | B |
| 1 | 0 | 0 | 0 | 0 | 0 | | | | | | | | | 0 | 0 |
| 2 | 0 | 1 | 1 | 1 | 1 | | | | | | | | | 1 | 1 |
| 3 | -1 | -1 | 0 | -1 | 0 | | | | | | | | | 0 | -1 |
| 4 | | | | | | | | | | | | | | | |
| .. | | | | | | | | | | | | | | | |
| .. | | | | | | | | | | | | | | | |
| .. | | | | | | | | | | | | | | | |
| .. | | | | | | | | | | | | | | | |
| .. | | | | | | | | | | | | | | | |
| .. | | | | | | | | | | | | | | | |
| 255 | 3 | -1 | 2 | 1 | 3 | | | | | | | | | 3 | 3 |
| 256 | -3 | -2 | 2 | -3 | 0 | | | | | | | | | -2 | 2 |

IDENTIFICATION NUMBER (row labels)

FIG. 13

|  | 1 | 2 | 3 | 4 | 5 | .. | .. | .. | .. | .. | .. | .. | 1919 | 1920 |
|---|---|---|---|---|---|---|---|---|---|---|---|---|---|---|
| 1 | 256 | 25 | 7 | 7 | 37 | | | | | | | | 16 | 16 |
| 2 | 140 | 140 | 7 | 184 | 184 | | | | | | | | 207 | 207 |
| 3 | 55 | 83 | 184 | 157 | 110 | | | | | | | | 221 | 16 |
| 4 | 55 | 83 | 157 | 110 | 110 | | | | | | | | 221 | 16 |
| .. | | | | | | | | | | | | | | |
| .. | | | | | | | | | | | | | | |
| .. | | | | | | | | | | | | | | |
| .. | | | | | | | | | | | | | | |
| .. | | | | | | | | | | | | | | |
| .. | | | | | | | | | | | | | | |
| 1079 | 188 | 156 | 156 | 58 | 66 | | | | | | | | 221 | 16 |
| 1080 | 156 | 156 | 156 | 58 | 172 | | | | | | | | 16 | 16 |

FIG. 15A

|     | 1 | 2 | 3 | . . | . . | 8  | 9  |
|-----|---|---|---|-----|-----|----|----|
| 1   | 0 | 0 | 0 |     |     | 0  | 0  |
| 2   | 0 | 1 | 1 |     |     | -2 | -1 |
| 3   | 1 | 1 | 0 |     |     | -1 | -1 |
| . . |   |   |   |     |     |    |    |
| . . |   |   |   |     |     |    |    |
| . . |   |   |   |     |     |    |    |
| . . |   |   |   |     |     |    |    |
| . . |   |   |   |     |     |    |    |
| 255 | 3 | 1 | 2 |     |     | -3 | -3 |
| 256 | 3 | 2 | 2 |     |     | -2 | -2 |

FIG. 15B

|     | 1 | 2 | 3 | 4  | 5 | . . | . . | 13 | 14 | 15 |
|-----|---|---|---|----|---|-----|-----|----|----|----|
| 1   | 0 | 0 | 0 | 0  | 0 |     |     | 0  | 0  | 0  |
| 2   | 0 | 1 | 1 | 2  | 3 |     |     | 0  | -2 | -1 |
| 3   | 1 | 1 | 0 | -1 | 2 |     |     | 0  | -1 | -1 |
| . . |   |   |   |    |   |     |     |    |    |    |
| . . |   |   |   |    |   |     |     |    |    |    |
| . . |   |   |   |    |   |     |     |    |    |    |
| . . |   |   |   |    |   |     |     |    |    |    |
| . . |   |   |   |    |   |     |     |    |    |    |
| 255 | 3 | 1 | 2 | -1 | 3 |     |     | -2 | -3 | -3 |
| 256 | 3 | 2 | 2 | 3  | 0 |     |     | -1 | -2 | -2 |

FIG. 16

|     | 1   | 2   | 3   | 4   | 5   | . . | . . | . . | . . | . . | . . | 959 | 960 |
| --- | --- | --- | --- | --- | --- | --- | --- | --- | --- | --- | --- | --- | --- |
| 1   | 5   | 25  | 18  | 7   | 37  |     |     |     |     |     |     | 167 | 16  |
| 2   | 120 | 140 | 36  | 184 | 14  |     |     |     |     |     |     | 20  | 27  |
| 3   | 55  | 83  | 84  | 57  | 110 |     |     |     |     |     |     | 221 | 163 |
| 4   | 55  | 83  | 157 | 10  | 110 |     |     |     |     |     |     | 22  | 16  |
| . . |     |     |     |     |     |     |     |     |     |     |     |     |     |
| . . |     |     |     |     |     |     |     |     |     |     |     |     |     |
| . . |     |     |     |     |     |     |     |     |     |     |     |     |     |
| . . |     |     |     |     |     |     |     |     |     |     |     |     |     |
| . . |     |     |     |     |     |     |     |     |     |     |     |     |     |
| 539 | 88  | 15  | 16  | 58  | 66  |     |     |     |     |     |     | 221 | 16  |
| 540 | 126 | 56  | 56  | 58  | 172 |     |     |     |     |     |     | 106 | 160 |

FIG. 18A (0, 0, 0)

| | R | G | B |
|---|---|---|---|
| 1 | 0 | 0 | 0 |
| 2 | 1 | 0 | 0 |
| 3 | 0 | 1 | 0 |
| 4 | 0 | 0 | 1 |
| 5 | 0 | 1 | 1 |
| 6 | 1 | 1 | 0 |
| 7 | 0 | 0 | 1 |
| 8 | 1 | 0 | 0 |
| 9 | 0 | 1 | 0 |
| 10 | 1 | 0 | 0 |
| ⋮ | ⋮ | ⋮ | ⋮ |
| 518398 | 0 | 0 | 1 |
| 518399 | 1 | 1 | 0 |
| 518400 | 0 | 1 | 0 |

(128, 128, 128)

| | R | G | B |
|---|---|---|---|
| 1 | 129 | 128 | 128 |
| 2 | 128 | 128 | 128 |
| 3 | 128 | 127 | 128 |
| 4 | 128 | 128 | 128 |
| 5 | 128 | 128 | 127 |
| 6 | 127 | 128 | 128 |
| 7 | 128 | 129 | 128 |
| 8 | 128 | 128 | 128 |
| 9 | 129 | 128 | 127 |
| 10 | 128 | 128 | 128 |
| ⋮ | ⋮ | ⋮ | ⋮ |
| 518398 | 129 | 128 | 128 |
| 518399 | 128 | 129 | 128 |
| 518400 | 128 | 128 | 127 |

(255, 255, 255)

| | R | G | B |
|---|---|---|---|
| 1 | 254 | 255 | 255 |
| 2 | 255 | 255 | 254 |
| 3 | 255 | 254 | 255 |
| 4 | 255 | 255 | 255 |
| 5 | 254 | 255 | 255 |
| 6 | 255 | 255 | 254 |
| 7 | 255 | 254 | 255 |
| 8 | 255 | 255 | 255 |
| 9 | 254 | 255 | 255 |
| 10 | 255 | 255 | 254 |
| ⋮ | ⋮ | ⋮ | ⋮ |
| 518398 | 254 | 255 | 255 |
| 518399 | 255 | 254 | 255 |
| 518400 | 255 | 254 | 255 |

FIG. 20
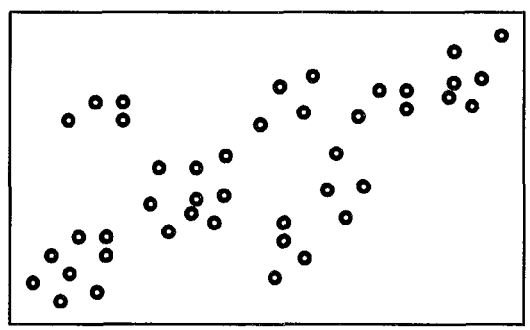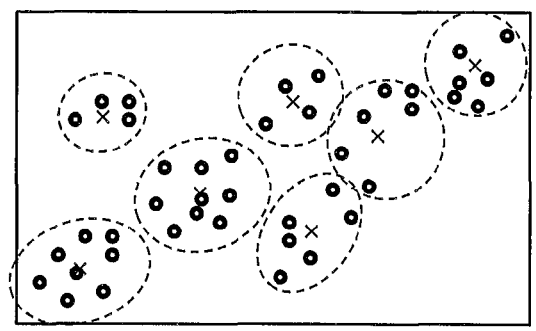

DISPLAY CALIBRATION SYSTEM AND STORAGE MEDIUM

This nonprovisional application claims priority under 35 U.S.C. §119 on Patent Application No. 2014-016031 filed in Japan on Jan. 30, 2014, the entire contents of which is hereby incorporated by reference.

TECHNICAL FIELD

The present invention relates to a display calibration system, a display calibration method, and a storage medium all of which implements a calibration process (calibration) for correcting display non-uniformity of a display device(s).

BACKGROUND ART

In recent years, a display device with a large screen has been used for a wide variety of applications, such as a signage and an information display. With this trend, there have been increasingly developed a single display providing a large screen display and a large-screen display system including multiple displays in which a plurality of displays are arranged in a matrix manner.

A liquid crystal panel display includes: a liquid crystal panel including two glass substrates between which a liquid crystal material is sealed; and a backlight provided on a back side of the liquid crystal panel. Such a display provides image display by driving the liquid crystal panel in response to an incoming image signal from an external apparatus such as a PC (personal computer) or a reproducing apparatus.

A liquid crystal display device includes a gate driver and a source driver, each of which serves as a circuit for driving the liquid crystal panel. The gate driver and the source driver, which are connected to a gate and source of a transistor for driving each pixel of the liquid crystal panel, (i) control turn-on/turn-off of the transistor in accordance with an incoming image signal and (ii) apply, to the transistor in the on position, a voltage (input level of input to the liquid crystal panel) corresponding to the image signal, thereby changing optical transmittance determined by electro-optical characteristics of the liquid crystal material. With this arrangement, the liquid crystal display device can produce tone by controlling, for each pixel, the amount of light transmitting the liquid crystal panel upon illumination from the backlight.

As for the liquid crystal panel, the electro-optical characteristics of the liquid crystal material are determined by a so-called cell gap, which is a distance between the glass substrates between which the liquid crystal material is sealed. Due to a manufacturing variation or for other reason, the liquid crystal panel can include pixels having varying cell gaps whose values are deviated from their design values. This can cause deviation of the optical transmittance of the liquid crystal panel from its design value, with the result that an unsatisfactory gamma characteristic (display non-uniformity) of the liquid crystal panel is obtained.

Meanwhile, the above large screen display system can have the problem of differences in gamma characteristic and output color between the displays provided therein, due to non-uniform display characteristics of the displays.

In view of this, there has been proposed a system in which an image of a display section of a display device is captured, and information on luminance values and output color, which information is obtained from data of the captured image, is then stored together with positional information, so that a calibration process for performing display non-uniformity correction is carried out to provide uniform display.

For example, Patent Literature 1 proposes a multi-projection system, wherein a screen onto which separate color images are projected by projectors is divided into a plurality of small regions, and brightness and color characteristics of each of the small regions are measured and then stored, as a profile, together with its positional information. In the system, the screen onto which separate color images are projected by the projectors is divided into an arbitrary number of small regions during the projection, a profile is selected in accordance with the positional information of the small region, and the separate color images are then subjected to color conversion using the selected profile so that brightness and color corrections of the images are performed. Consequently, a high degree of color reproduction is achieved across the entire screen.

CITATION LIST

Patent Literature

Patent Literature 1

Japanese Patent Application Publication, Tokukai No. 2003-46751 (Publication date: Feb. 14, 2003)

SUMMARY OF INVENTION

Technical Problem

The calibration process performed with respect to the display device is carried out, during an inspection prior to shipment from a factory, to suppress display non-uniformity caused during manufacture. Further, the calibration process is also carried out on a user side to suppress display non-uniformity caused by time-dependent deterioration. The calibration process carried out on the user side takes some time. This, however, is no serious problem. On the other hand, the calibration process carried out prior to shipment from a factory takes significant time because the display devices to be calibrated are large in number. For this reason, it is necessary to make an overall time taken for the calibration process for each display device as short as possible while maintaining the accuracy of the calibration process in an acceptable level.

An object of the present invention is to provide a display calibration system and a storage medium both of which enables a processing time required for the calibration process to be shorter than ever before while maintaining accuracy of the calibration process in an acceptable level.

Solution to Problem

A display calibration system in accordance with an aspect of the present invention includes:

a correction data outputting section configured to determine, for individual pixels of a display section, their respective pieces of correction data on a basis of (i) measurement values obtained by measurements on a plurality of color patches displayed on the display section subject to calibration and (ii) reference values preset with respect to pieces of color component data for displaying the color patches, the pieces of correction data each representing one of adjustment values and corrected color component values, both of which are applied to the pieces of color component data; and a first storage section configured to store therein reference data representing, for the color patches of a first predetermined number, their respective correspondences between the pieces of color component data and the reference values, the correction data outputting section obtaining, for the individual pixels of the display section, their respective pieces of correction data on a basis of the reference data and the measurement values of the color patches of a second predetermined number that is less than the first predetermined number, the respective pieces of correction data each representing one of adjustment values and corrected color component values with respect to the color component data of the individual color patches of the predetermined second number.

Advantageous Effects of Invention

A display calibration system in accordance with an aspect of the present invention yields the effect of enabling a processing time required for the calibration process to be shorter than ever before while maintaining accuracy of the calibration process in an acceptable level.

BRIEF DESCRIPTION OF DRAWINGS

FIG. 3B is an explanatory view illustrating correspondences between pixels of measurement data after the size adjustment and color information of the pixels of measurement data before the size adjustment.

FIG. 3C is a second explanatory view illustrating correspondences between pixels of measurement data after size adjustment and color information of each pixel of measurement data before the size adjustment.

FIG. 5 is a diagram illustrating measurement data obtained by a measuring section.

FIG. 7B is an explanatory view illustrating a part of the reference data which part is to be read.

FIG. 12 is a view illustrating a non-uniformity correction map.

FIG. 13 is a view illustrating an index map.

FIG. 15A is a view illustrating a non-uniformity correction map used in first-stage correction performed in accordance with Embodiment 2.

FIG. 15B is a view illustrating another non-uniformity correction map used in the first-stage correction performed in accordance with Embodiment 2.

FIG. 16 is a view illustrating an index map used in the first-stage correction performed in accordance with Embodiment 2.

FIG. 18A is a view illustrating a representative value table used in the first-stage correction.

FIG. 20 is an explanatory view illustrating the concept of the clustering process.

DESCRIPTION OF EMBODIMENTS

Embodiment 1

The following will describe an embodiment of the present invention with reference to the drawings. First, the configuration of a display calibration system in accordance with the present embodiment will be described.

(Configuration of Display Calibration System)

Figure 1:
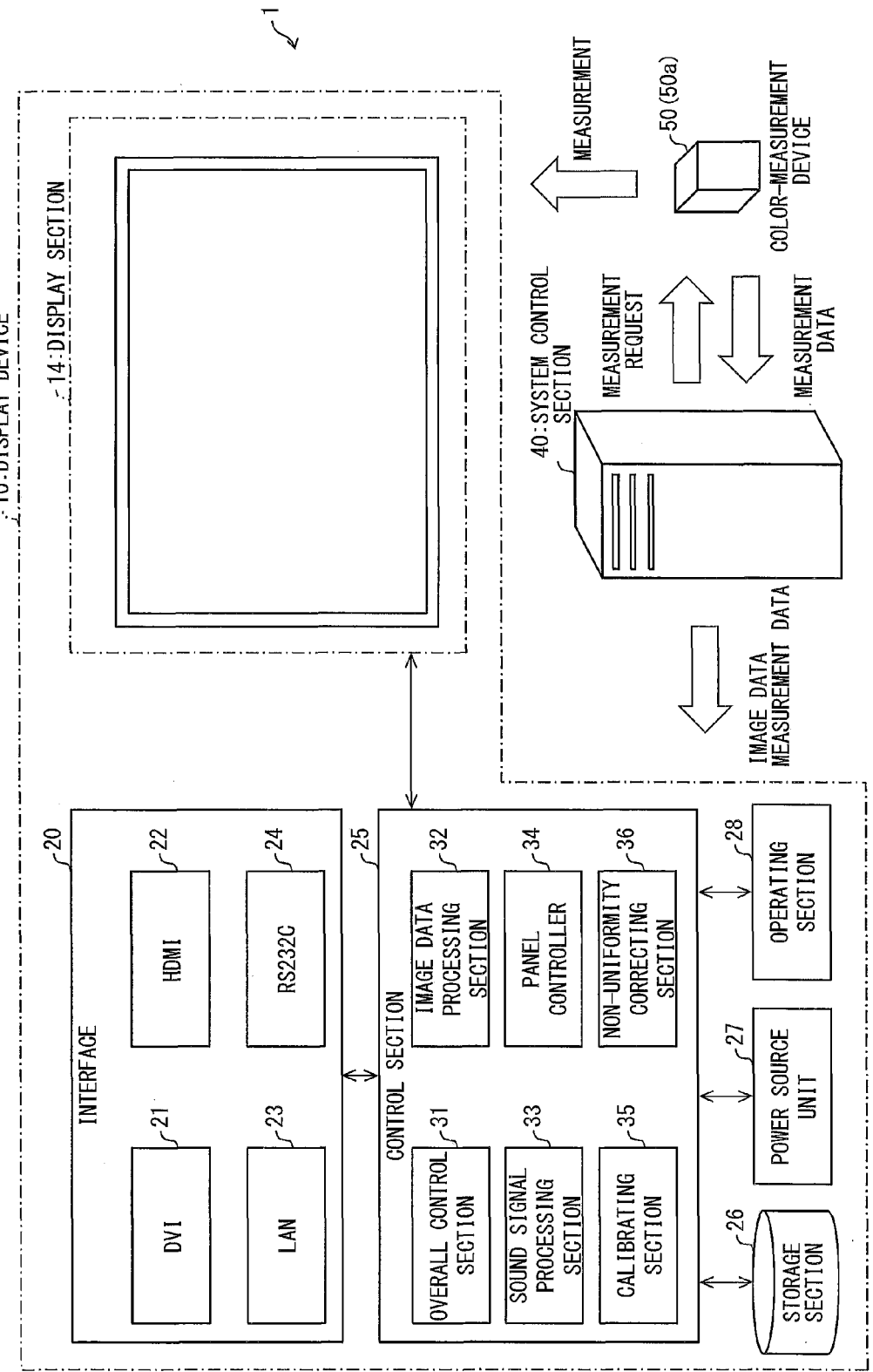
FIG. 1 is a block diagram illustrating a schematic configuration of a display calibration system in accordance with an embodiment of the present invention.

As illustrated in FIG. 1, a display calibration system 1 in accordance with the present embodiment includes a display device 10, a system control section (computer) 40, and a measuring section 50. The display device 10 includes an interface 20, a control section (signal processing section) 25, a storage section 26, a power source unit 27, an operating section 28, and a display section 14.

The interface 20 includes: a DVI (Digital Visual Interface) terminal 21 and a HDMI® (High-Definition Multimedia Interface) terminal 22, both of which are used for serial communications based on TMDS (Transition Minimized Differential Signaling); a LAN terminal 23 and a RS232C terminal 24; both of which are used for communications based on a communication protocol such as TCP (Transmission Control protocol) or UDP (User Datagram Protocol); and a display port terminal (not shown).

The interface 20 transmits/receives data to/from an external apparatus(es) connected to the DVI terminal 21, the HDMI® terminal 22, the Display Port terminal, the LAN terminal 23, the RS232C terminal 24, and/or the like terminal, in accordance with an instruction from an overall control section 31, which will be described later, of the control section 25. The interface 20 may further include a USB terminal and an IEEE1394 terminal.

The storage section (second storage section) 26, which is an information storage device such as a hard disk or semiconductor memory, stores therein various kinds of data handled by the control section 25. Further, in the present embodiment, the storage section 26 is also configured to store therein a non-uniformity correction map (FIG. 12) and an index map (FIG. 13), both of which are used during non-uniformity correction, after these maps are generated by a calibrating section 35 of the control section 25. This will be described later.

The control section (signal processing section) 25, which is a computer or a control circuit that controls the display device 10, includes the overall control section 31, an image data processing section 32, a sound (audio) signal processing section 33, a panel controller 34, the calibrating section 35, and an non-uniformity correcting section 36.

The overall control section 31 is a block configured to perform centralized control of pieces of hardware included in the display device 10. The image data processing section 32 is a block configured to, upon receipt of image data (image data to be displayed on the display section 14) from the system control section 40 via the interface 20, subject the image data to predetermined processing. Note that the image data handled in the present embodiment is data of 8 bits (0 to 255). The sound signal processing section 33 is a block configured to, upon receipt of a sound signal (a signal of sound outputted from a speaker of the display section 14) from the system control section 40 via the interface 20, subject the sound signal to predetermined processing.

The calibrating section 35 performs calibration to determine, for each pixel, adjustment values for non-uniformity correction, and then generate, for each pixel, adjustment value information representing these adjustment values. Further, the calibrating section 35 uses the adjustment value information to generate the non-uniformity correction map (FIG. 12) and the index map (FIG. 13), both of which are used for non-uniformity correction, and then causes these maps to be stored in the storage section 26.

The non-uniformity correcting section 36 performs non-uniformity correction to correct display non-uniformity (herein, color non-uniformity and luminance non-uniformity are collectively referred to as the "display non-uniformity") by adjusting color component values (for example, RGB values) of image data of an image to be displayed on the display section 14, with reference to the non-uniformity correction map and the index map, both of which are stored in the storage section 26. It should be noted that the non-uniformity correcting section 36 may be configured to perform non-uniformity correction with respect to image data that has been processed by the image data processing section 32 or to perform non-uniformity correction with respect to image data before processed by the image data processing section 32.

The panel controller 34 is configured to control the display section 14 to display thereon an image of image data that has been processed by the image data processing section 32 and the non-uniformity correcting section 36. The panel controller 34 is also configured to cause the display section 14 to display thereon a color patch for calibration process, upon receipt of an instruction from the system control section 40 to display a color patch.

The power source unit 27 controls power supplied from an external entity. The overall control section 31 causes the power source unit 27 to provide or shut off a power supply, in accordance with an operation instruction received from a power source switch (not illustrated) of the operating section 28. In a case where the operation instruction received from the power source switch is an operation instruction of switching power on, a power supply is provided to the pieces of hardware included in the display device 10. On the other hand, in a case where the operation instruction received from the power source switch is an operation instruction of switching power off, a power supply to the pieces of hardware included in the display device 10 is shut off.

The display section 14 is, for example, a liquid crystal display device (LCD), a plasma display panel, an organic EL display device, or the like device, and displays thereon an image under control of the panel controller 34. It should be noted that the present embodiment deals with an example in which the display section 14 is made up of one (1) display as illustrated in FIG. 1, but the display section 14 may alternatively be made up of multiple displays, which are a plurality of displays arranged side by side.

The operating section 28 is an operating member for allowing a user to input various kinds of instructions therewith. The operating section 28 also includes a power source switch (not illustrated). The power source switch is a switch for inputting operation instructions to instruct switching between power-on and power-off. The operating section 28 is configured to, upon receipt of the operation instruction provided through the power source switch, output the operation instruction to the overall control section 31.

The measuring section 50 includes a color-measurement device 50a provided with an input/output terminal(s) such as a USB terminal and an RS232C terminal. In response to a measurement request signal from the system control section 40, the color-measurement device 50a performs measurement on a color patch displayed on the display section 14, and then transmits a result of the measurement to the system control section 40. More specifically, the color-measurement device 50a is a device configured to capture an image of a color patch displayed on a display screen of the display section 14, and then outputs, as measurement data, a measurement value (e.g. a measurement value such as an XYZ value) obtained for each pixel by the color-measurement device 50a through the image capture. Examples of the color-measurement device 50a encompass a two-dimensional color analyzer, such as a luminance and chromaticity uniformity analyzer (UA-1000A, etc.) manufactured by Topcon Corporation and a 2D color analyzer or colorimeter (CA-2000, etc.) manufactured by Konica Minolta, Inc., a high-definition digital camera manufactured by Nikon Corporation, Sony Corporation, or other manufacturer, and a camera for industrial use.

It is preferable that one (1) color-measurement device which is capable of capturing a whole image of the display section 14 at a time is used for the measurement. Alternatively, a plurality of color-measurement devices may be used to capture a whole image of the display section 14. Further alternatively, the color-measurement device may be moved to perform several measurements at different positions, so that several pieces of data obtained by the measurements are connected to each other to obtain resultant measurement data.

In order to perform measurement of the display section 14, a tool (application software) which enables data communications with the color-measurement device 50a is installed on the system control section 40, and the color-measurement device 50a is, for example, USB-connected to the system control section 40 so that the color-measurement device 50a is used. The following processes may be sequentially performed such that a measurer carries out a measurement on a measurement-targeted color patch displayed on the display section 14 by using the color-measurement device 50a, and then stores resultant measurement data. Unfortunately, this is a time-consuming procedure involving considerable efforts and can cause operating errors. This is because there are a plurality of color patches (several tens of kinds of color patches), and operating instructions for display and image capture need to be repeated for many times equal to the number of color patches targeted for measurement. In view of this, it is safe that, under control of the system control section 40, the display section 14 and the measuring section 50 automatically perform a series of operations, "image display", "measurement", "storage of measurement data", and "change of color patch".

Further, it is efficient that settings of measurement conditions for the color-measurement device 50a (shutter speed, aperture, focus, the number of time of measurements, etc. for image capture using a camera), data management (data storage), and others are performed set under control of the system control section 40.

(Calibrating Section 35)

Next, the calibrating section 35 illustrated in FIG. 1 will be described. The calibrating section 35 is a block configured to, after the measurement on a color patch displayed on the display section 14 by the color-measurement device 50a, receive measurement data obtained by the measurement and then perform a calibration process based on the received measurement data. The following descriptions assume that data obtained from one (1) color patch is one (1) piece of measurement data. That is, one piece of measurement data is a collection of pieces of data obtained by capturing an image of one (1) color patch and is a collection of pixel-by-pixel measurement values (XYZ values) obtained by the color-measurement device 50a.

Figure 2:
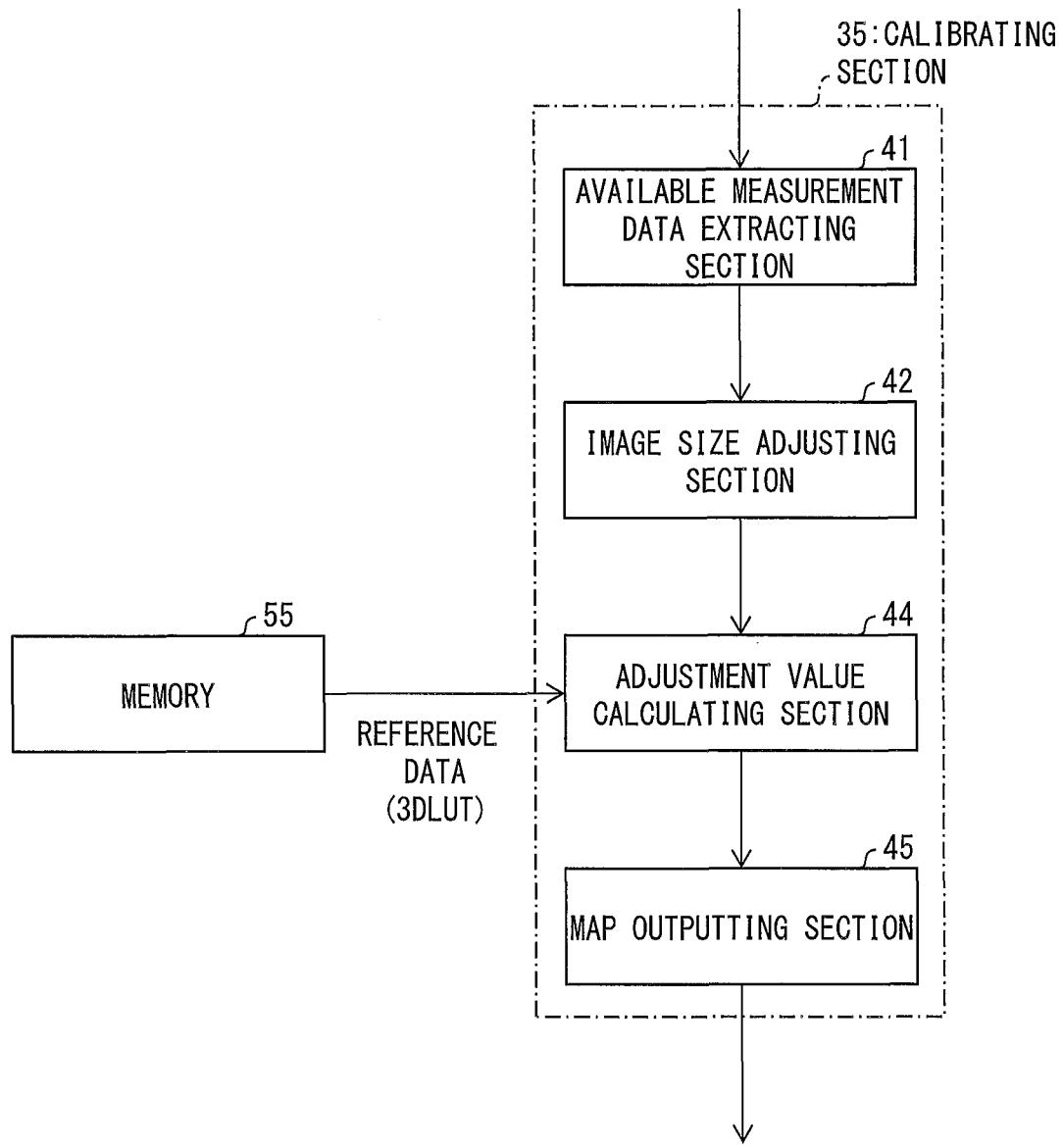
FIG. 2 is a block diagram illustrating a schematic configuration of a calibrating section illustrated in FIG. 1.

FIG. 2 is a block diagram illustrating a schematic configuration of the calibrating section 35. As illustrated in FIG. 2, the calibrating section 35 includes an available measurement data extracting section 41, an image size adjusting section 42, an adjustment value calculating section 44, and a map outputting section 45. Although not illustrated in FIG. 1, memory 55 illustrated in FIG. 2 is included in the display device 10.

(Available Measurement Data Extracting Section 41)

The available measurement data extracting section 41 is a block configured to extract, as available data, a portion of measurement data which portion corresponds to an image displayed on the display section 14 from the measurement data transmitted from the color-measurement device 50a. More specifically, since a necessary portion of data of a two-dimensional image captured by the color-measurement device 50a is data of an image corresponding to the display screen of the display section 14, the available measurement data extracting section 41 extracts, as the available data, an available portion (necessary portion) from the measurement data. The measurements performed through the use of the color-measurement device 50a are measurements performed on successively displayed color patches in such a state that the color-measurement device 50a and the display screen of the display section 14 are placed in relation to each other. By detecting color differences in the measurement data by comparisons of the individual pieces of measurement data obtained based on the color patches, it is possible to identify the portion corresponding to the image displayed on the display section 14.

(Image Size Adjusting Section 42)

The image size adjusting section 42 is a block configured to adjust the size (number of pixels) of the measurement data extracted by the available measurement data extracting section 41, according to the size of that measurement data and the size of the display section 14. The size adjustment is an action to make the number of pixels of the measurement data equal to the number of pixels of the display screen by subjecting the measurement data to a magnification/reduction process, an interpolation process, or the like so that one-to-one correspondence is established between the pixels of the measurement data and the pixels of the display section 14. This is because the size (number of pixels) of the measurement data outputted from the available measurement data extracting section 41 is generally different from the size (number of pixels) of the display screen of the display section 14. That is, the size adjustment used herein means adjustment of the amount of data (number of pixels). This action will be described below with a specific example thereof.

Figure 3A:
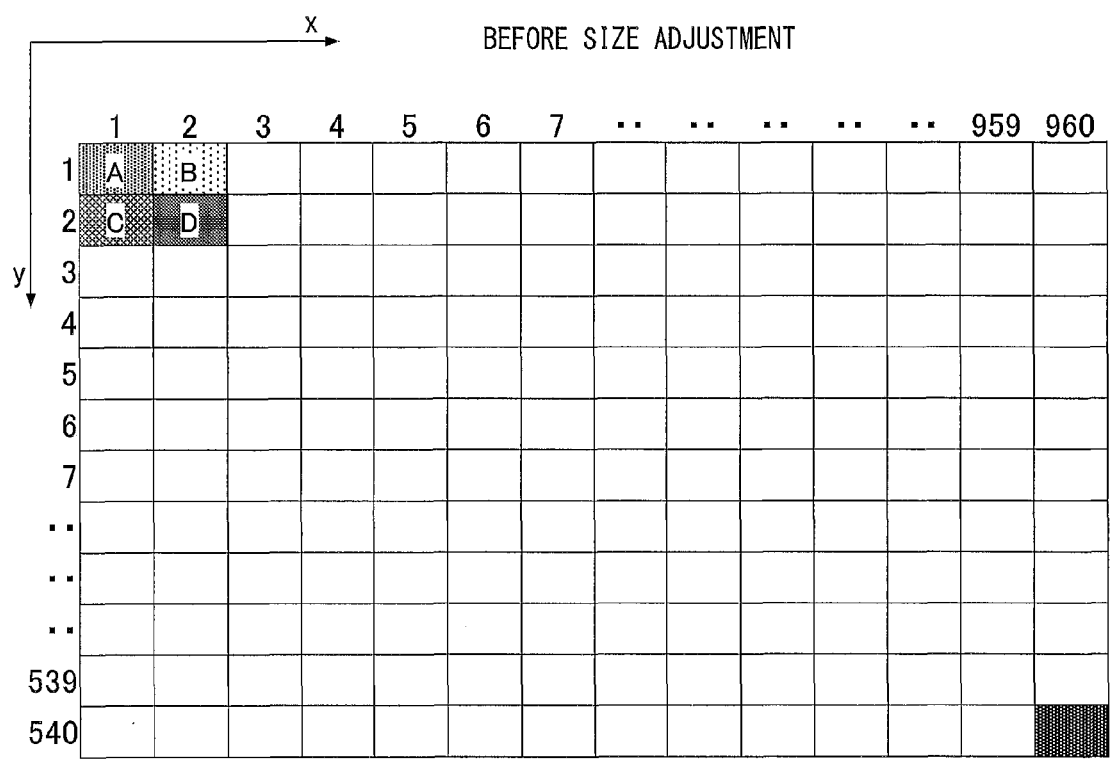
FIG. 3A is an explanatory view (diagram) illustrating pixels of measurement data before size adjustment.

For example, in a case where the display section 14 is a full high-definition (FHD) display, the number of pixels of the display section 14 is 1920 (horizontal direction, x direction)×1080 (vertical direction, y direction), as illustrated in FIG. 3B. Here, assume that the measurement was made by the color-measurement device 50a capable of performing measurement of an image of 1024 pixels (horizontal)×768 pixels (vertical), and the number of pixels of the measurement data extracted by the available measurement data extracting section 41 is 960 (horizontal)×540 (vertical), as illustrated in FIG. 3A.

In this case, the number of pixels of the measurement data and the number of pixels of the display section 14 are in a ratio of 1:2 both in the horizontal direction and in the vertical direction. For this reason, generating, from a pixel (x, y) of the measurement data before subjected to the size adjustment, pixels (2x, 2y), (2x−1, 2y−1), (2x, 2y−1), and (2x−1, 2y) of the measurement data obtained after the size adjustment enables a one-to-one correspondence between the pixels of the measurement data obtained after the size adjustment and the pixels of the display section 14. For example, as illustrated in FIGS. 3A and 3B, a measurement value A of a pixel (1, 1) before the size adjustment becomes measurement values A of pixels (1, 1), (2, 1), (1, 2), and (2, 2) after the size adjustment. Further, as illustrated in FIGS. 3A and 3B, a measurement value C of a pixel (1, 2) before the size adjustment becomes measurement values C of pixels (1, 3), (2, 3), (1, 4), and (2, 4) after the size adjustment.

However, the size adjustment as illustrated in FIG. 3B causes an event in which pieces of color information of all of the pixels in a block, which consists of four pixels adjacent to each other, have identical values. In order to avoid the occurrence of such an event, the image size adjusting section 42 performs size adjustment as described below.

Figure 4:
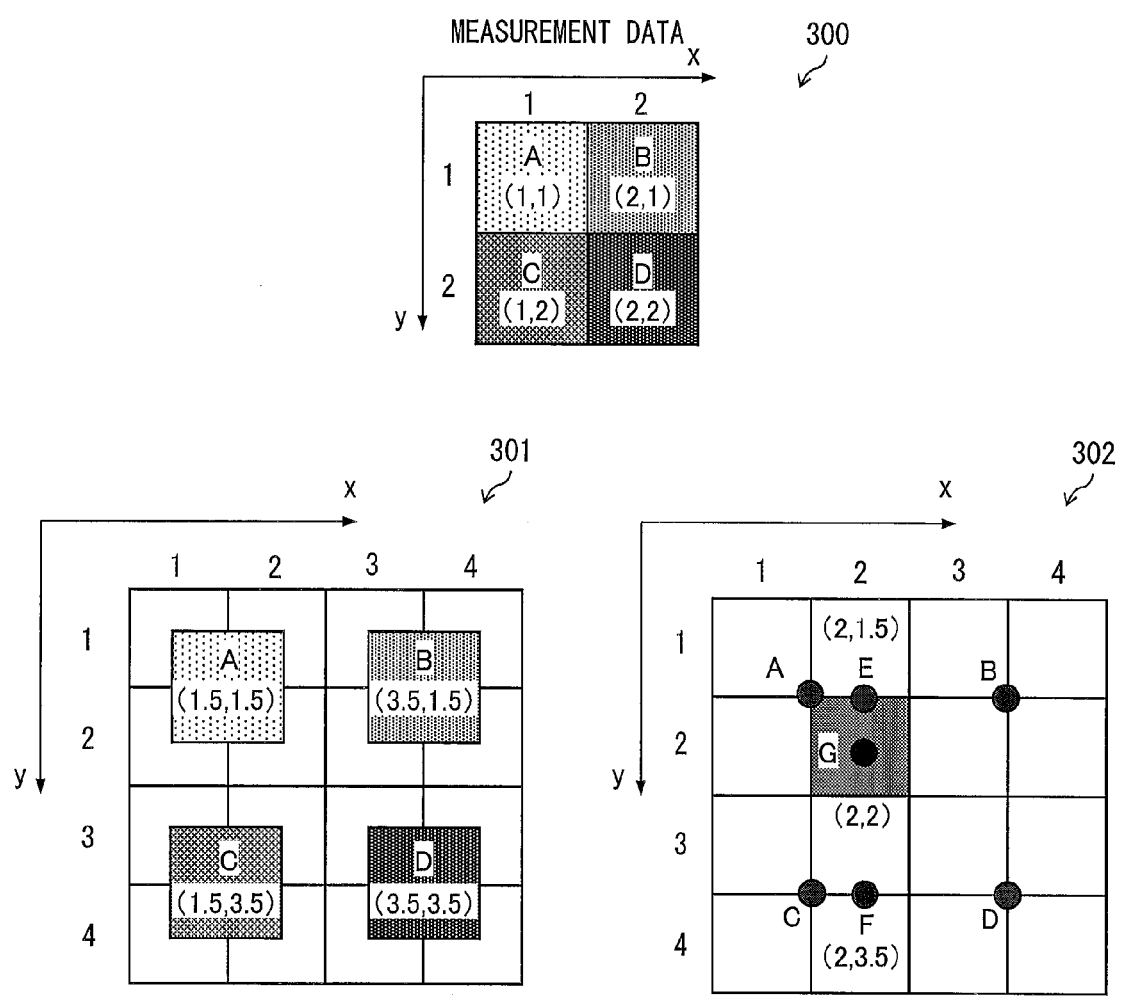
FIG. 4 is an explanatory view illustrating a method for determining color information of the pixels of the measurement data after the size adjustment.

Strictly speaking, each of the pixels of the measurement data obtained before the size adjustment corresponds to a center position of the four pixels of the measurement data obtained after the size adjustment. For example, a pixel (1, 1) before subjected to the size adjustment, illustrated in FIG. 3A and FIG. 4 (as represented by reference numeral 300), corresponds to a position (1.5, 1.5) of the measurement data obtained after the size adjustment (measurement value A), as illustrated in FIG. 3C and FIG. 4 (as represented by reference numeral 301). Similarly, a pixel (2, 1) before subjected to the size adjustment corresponds to a position (3.5, 1.5) of the measurement data obtained after the size adjustment (measurement value B). Similarly, a pixel (1, 2) before subjected to the size adjustment corresponds to a position (1.5, 3.5) of the measurement data obtained after the size adjustment (measurement value C). Similarly, a pixel (2, 2) before subjected to the size adjustment corresponds to a position (3.5, 3.5) of the measurement data obtained after the size adjustment (measurement value D).

Through linear interpolation of the pixels before subjected to the size adjustment, the pixels after subjected to the size adjustment are generated. For example, as represented by reference numeral 302 in FIG. 4, a measurement value G of the pixel (2, 2) after subjected to the size adjustment is determined from the measurement values A to D. That is, a measurement value E of (2, 1.5) is determined from the measurement value A of (1.5, 1.5) and the measurement value B of (3.5, 1.5). A measurement value F of (2, 3.5) is determined from the measurement value C of (1.5, 3.5) and the measurement value D of (3.5, 3.5). Further, the measurement value G of (2, 2) is determined from the measurement value E of (2, 1.5) and the measurement value F of (2, 3.5).

Specifically, the measurement value G can be determined by linear interpolation using the following Equations a1 to a3:

$$E = A + (2-1.5)/(3.5-1.5) \times (B-A) \quad \text{Equation a1;}$$

$$F = C + (2-1.5)/(3.5-1.5) \times (D-C) \quad \text{Equation a2; and}$$

$$G = E + (2-1.5)/(3.5-1.5) \times (F-E) \quad \text{Equation a3.}$$

As described above, the image size adjusting section 42 in FIG. 2 can also perform size adjustment of the measurement data by using linear interpolation. However, the linear interpolation is not necessarily used. Alternatively, spline interpolation or other interpolation method may be used.

With this arrangement, even in a case where the number of pixels of the color-measurement device 50a, such as a two-dimensional color analyzer, is smaller than the number of pixels of the display section 14, individual measurement values of the pixels in the measurement data can be made closely approximate to exact values of colors given from the individual pixels of the display section 14. Hence, in a case where the display section 14 is not only the full high-definition (FHD) display as described earlier, but also a display having pixels larger in number than those of the full high-definition (FHD) display, like a high-resolution 4K2K display and multiple displays, which are these high-resolution displays arranged side by side, the measurement values of the measurement data can be accommodated to pieces of color information of the individual pixels of the display section.

Figure 5:
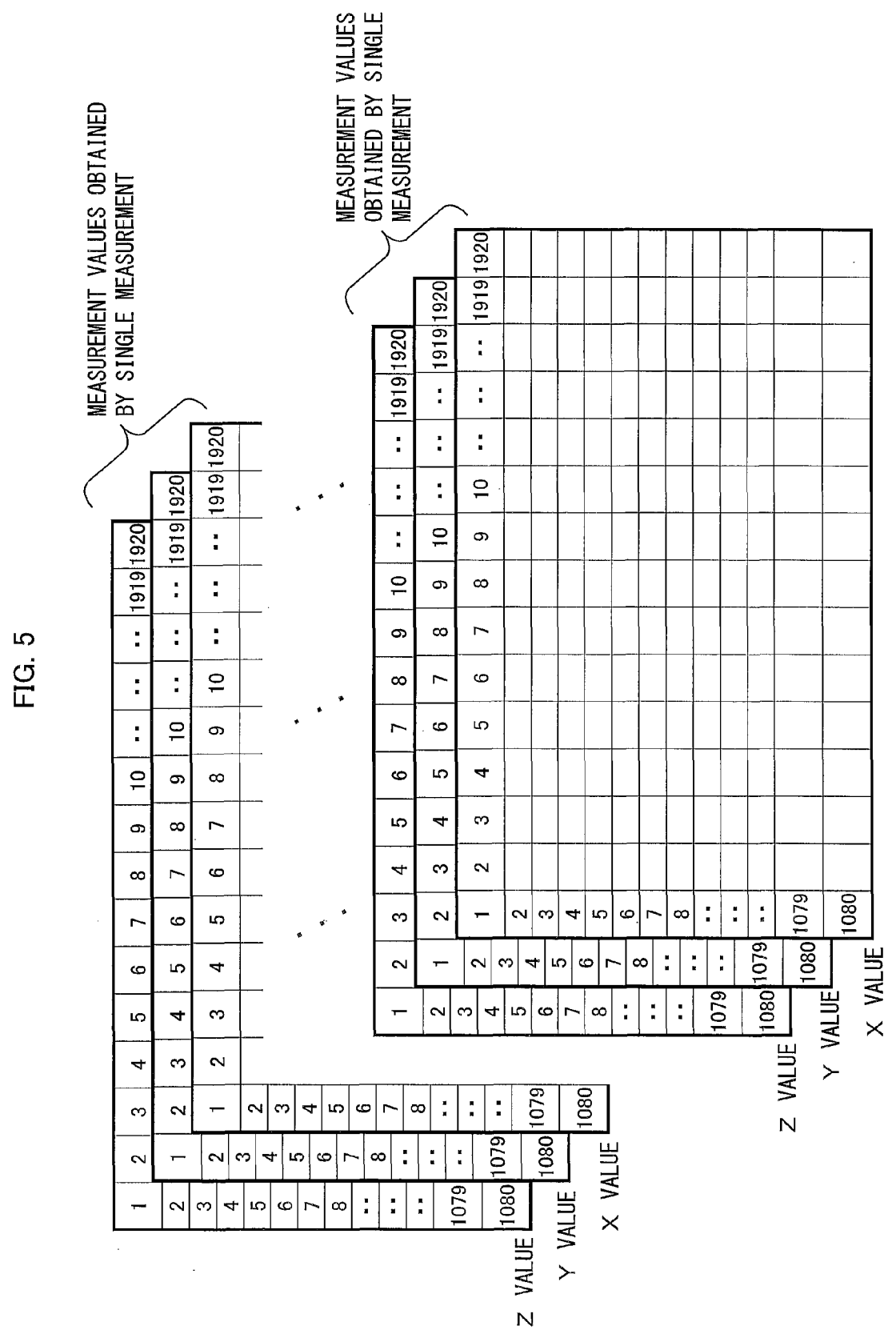

Since the above method enables a one-to-one correspondence between the pixels of the measurement data and the pixels of the display section 14, the measurement value can be obtained for each of the pixels of the display section 14. The measurement value is a result of measurement performed through the use of the instrument, such as a two-dimensional color analyzer, taken as an example of the color-measurement device 50a. The measurement value employed in the present embodiment is a tristimulus value (X, Y, Z). By a single measurement (measurement on a single color patch (having a single color)), three types of values (X, Y, Z) are obtained for each pixel. Accordingly, the amount of data obtained for each pixel by the measurements is expressed by multiplication of the number of measurements (the number of color patches) by three types of values (X value, Y value, and Z value), as illustrated in FIG. 5.

(Adjustment Value Calculating Section 44)

The adjustment value calculating section (correction data outputting section) 44 determines an adjustment value used in the non-uniformity correction on the basis of (i) the measurement data obtained by the measurement which is performed during the calibration and (ii) reference data (basic data).

Here, the measurement data is the measurement value (XYZ value) obtained for each pixel through the measurement on a color patch, displayed on each of the display devices 10, representing a predetermined RGB value during the calibration process performed on each of the display devices 10. The measurement data varies among the display devices 10.

On the contrary, the reference data is data stored in the memory 55 at the manufacture of the display device 10, and the reference data is data used in common among all of the display devices 10 of the same model. Specifically, the reference data includes reference values each of which is (i) a value used for comparison with the measurement value (measurement data), which is obtained by the measurement performed during the calibration, (ii) an ideal value (XYZ value) for the measurement value, and (iii) a value preset for each RGB value (see FIG. 7A). Further, the reference data is used in common among all of the pixels subject to the calibration process.

More specifically, to begin with, one or several reference devices are selected, in a factory, from among mass-produced display devices 10 of the same model. Subsequently, the selected reference device(s) is caused to display predetermined color patches that are greater in number than the color patches used during the calibration process, which will be performed later by each of the display devices 10. Then, measurements are performed by means of a color-measurement device as a reference device (reference color-measurement device), so that reference data is generated on the basis of results of the measurements. Using the reference color-measurement device is the best way for the measurements. However, in a case where only a single reference color-measurement device is available, another color-measurement device that is of the same model as that of the reference color-measurement device or that is comparable to the reference color-measurement device may be used as an alternative to the reference color-measurement device, provided that compatibility is provided between the color-measurement device as an alternative and the reference color-measurement device.

As described above, the reference device (reference display device) is selected from among a large number of display devices, measurements are performed on colors the number of which corresponds to the number of pieces of reference data required, by means of the reference color-measurement device or the alternative to the reference color-measurement device, and the reference data is then outputted on the basis of results of the measurements. The reference data is written in the memory (first storage section) 55 of all of the display devices 10 of the same model and is used in common among all of the display devices 10 of the same model.

The calibration process is performed on each of the display devices 10 in the following manner. That is, when a calibration process instruction is inputted to the display calibration system 1 that includes the display device 10 subject to the calibration process, the system control section 40 causes the display section 14 to display thereon an image of a color patch and then causes the color-measurement device 50a to perform measurement on the color patch image and then output the measurement data. The system control section 40 receives the measurement data from the color-measurement device 50a, and then transfers the measurement data to the display device 10. The measurement data is temporarily stored in the storage section 26. The measurement data stored in the storage section 26 is inputted to the calibrating section 35. After processed by the available measurement data extracting section 41 and the image size adjusting section 42, the measurement data is transmitted to the adjustment value calculating section 44. The adjustment value calculating section 44 reads the reference data from the memory 55 and then determines, as the adjustment value (adjustment value used to perform non-uniformity correction based on an input color component whose value is equal to an RGB value represented by the color patch), a value corresponding to a difference between the reference value of the reference data and the measurement value of the measurement data. The adjustment value calculating section 44 outputs, for each pixel, adjustment value information representing the adjustment values determined in the above manner.

(Map Outputting Section 45)

The map outputting section 45 generates the non-uniformity correction map illustrated in FIG. 12 and the index map illustrated in FIG. 13 on the basis of the adjustment value information outputted by the adjustment value calculating section 44, and then causes these maps to be stored in the storage section 26.

The following will more specifically describe the calibration process and the non-uniformity correction process together with their respective specific examples. First, the reference data used during the calibration process will be described in detail.

(Reference Data)

Figure 7A:
FIG. 7A is an explanatory view illustrating the reference data.

The reference data is, as illustrated in FIG. 7A, data of a list of the reference values (XYZ values) to be compared with the measurement values during the calibration process, and the reference values are associated with their respective RGB values. As a matter of course, the reference values listed in the reference data are preferably large in number. However, it is practically impossible to perform measurements on all of the RGB values displayable on the display section 14 (In this case, if one (1) color component is represented by eight bits, respective measurements on about 16,770,000 colors (256×256×256≈16,770,000) are needed.).

In view of this, the following nine color component values, 0, 32, 64, 96, 128, 192, 224, and 255, are selected from all of the color component values from 0 to 255, and RGB values obtained by any varying combinations of the selected color component values are designated as representative values. Then, color patches respectively corresponding to the representative values are displayed for the measurements.

Figure 6:
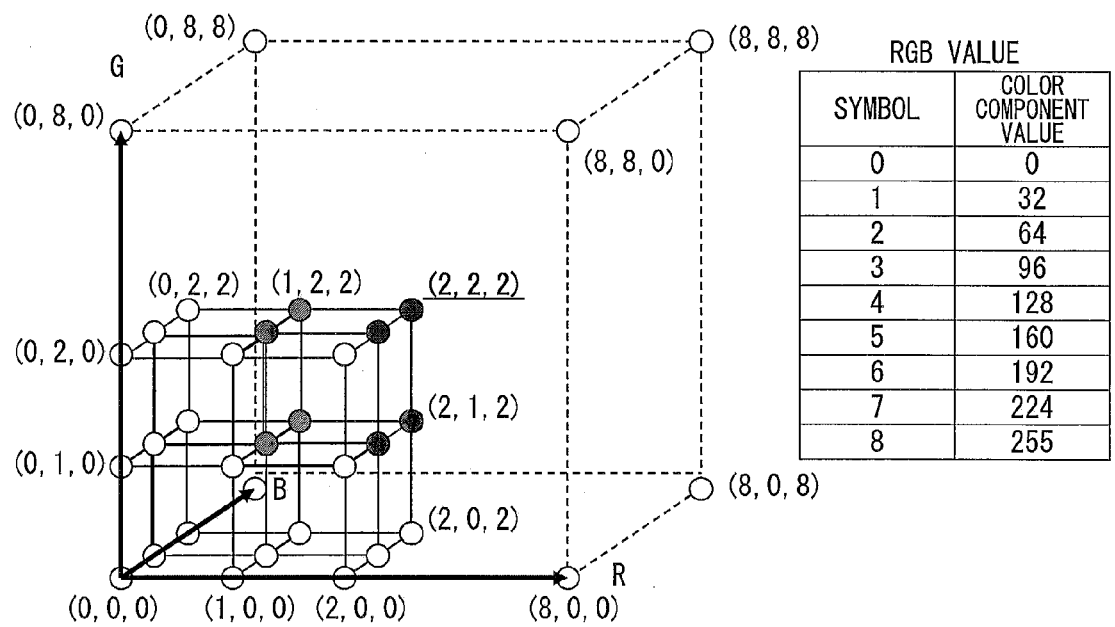
FIG. 6 is an explanatory view illustrating a color space showing RGB values to be used for reference data.

More specifically, color patches representing the representative values, which are 729 colors (9×9×9=729) in the color space illustrated in FIG. 6, are successively displayed for the measurements to obtain the XYZ values (reference values). Then, an LUT representing correspondences between the RGB values and the XYZ values as illustrated in FIG. 7A is generated as the reference data (It should be noted that numbers 0 to 8 shown in a color space of FIG. 6 each indicate any one of the color component values from 0 to 255 as illustrated in FIG. 6. For example, a color component value (RGB value) of a point (1, 2, 2) in the color space is (32, 64, 64). This also applies to FIGS. 8A to 8E and FIG. 10.).

Here, 729 measurements are time-consuming measurements but are practicable measurements. If a higher degree of accuracy is required, 17 color component values, 0, 16, 32, 28, 64, 80, 96, 112, 128, 144, 160, 176, 192, 208, 224, 240, and 255, may be selected so that 4913 colors (17×17×17=4913), which are obtained from any varying combinations of these 17 color component values, are designated as the representative values. Alternatively, the representative values may be further increased.

However, selecting too many color component values (e.g. 129 color component values of 0, 2, 4, . . . , 252, 254, and 255) requires a large number of measurements, which are practically difficult. On the other hand, selecting too few color component values (e.g. three color component values of 0, 128, and 255) is inadequate in terms of accuracy. Hence, as described earlier, in the present embodiment, the reference data is generated from results of measurements on the representative values of 729 colors, which are obtained from combinations of nine color component values, and the reference data is stored in the memory 55 of each of the display devices 10.

Further, the reference data is data such that the reference value (XYZ value) is uniquely determined for each RGB value (representative value) as illustrated in FIG. 7A, and the reference data is used in common for all of the pixels targeted for the calibration process during the calibration process. For example, (X, Y, Z)=(27.7, 12.63, 126.5) is uniquely associated with (R, G, B)=(0, 32, 96).

Still further, the reference data is used in common among the display devices of the same model. For this reason, one of the display devices 10 of the same model is selected as the reference device (reference display device) in a factory, and the reference data is generated based on measurement results obtained from that reference device.

Yet further, the reference value can be determined in a variety of methods. For example, out of data obtained through measurement on a color patch displayed under a certain setting condition, an average of measurement values in measurement data of the pixels contained in a center part of the display screen (e.g. an area, containing a pixel located in the center of the display screen, corresponding to 20% of the total display area) may be determined as the reference value. Alternatively, the reference value may be an average of the measurement values of pixels at a plurality of points extracted under a predetermined extraction condition, may be a measurement value of a pixel located at a predetermined reference position, or may be a maximum value, a minimum value, or an average of measurement values of all of the pixels.

Further alternatively, a plurality of the reference devices may be selected for the measurement, so that the reference value can be an average value, a maximum value, a minimum value, or the like value of respective measurement results obtained by these reference devices. That is, the reference data may be obtained by any method, provided that reference values obtained on the display devices 10 of the same model exhibit almost the same characteristics.

Note that, since the display calibration system 1 in accordance with the present embodiment includes the display section 14 which is made up of one (1) display, the reference data on that display is held in the memory 55. Further, in a case where the display section 14 is made up of a plurality of displays of a single model, the reference data on only that model is held in the memory 55. On the other hand, in a case where the display section 14 is made up of a plurality of displays of different models, pieces of reference data on the respective models are held in the memory 55. With this arrangement, the reference data on the displays of different models can be handled in the same manner as the reference data on the displays of a single model.

(Measurements Performed on the Display Device)

Next, the following will describe details of the measurements performed by each of the display devices 10 during the calibration process. The calibration process performed with respect to the display device 10 purchased and used by the user takes some time. This, however, is no serious problem. On the other hand, the calibration performed during an inspection prior to shipment from a factory takes significant time because the display devices 10 subject to the calibration process are large in number. For this reason, it is desirable that the calibration is performed for each display device in the shortest possible time (it is desirable that a time taken for the measurement performed during the calibration process is shorter than the time taken for the measurement performed for generation of the reference data).

Even if the overall time taken for the measurements for each display device needs to be made as short as possible, measurements using a minimum number of color patches are required in light of the accuracy of non-uniformity correction. For example, the use of five color patches having respectively different five colors, (0, 0, 0), (64, 64, 64), (128, 128, 128), (192, 192, 192), and (255, 255, 255) requires only five measurements and therefore enables shortening an overall time required for the measurements while maintaining the accuracy of non-uniformity correction in an acceptable level. However, the measurements on the above five color patches having respectively different five colors are merely grayscale measurements and can therefore lead to a difficulty in fine color non-uniformity correction.

In view of this, in the present embodiment, the measurements performed during the calibration are measurements using color patches having respectively different colors (27 colors in FIG. 10) that are fewer in number than the colors (729 colors in FIG. 7A) listed in the reference data. More specifically, the measurements are performed using color patches, which are displayed on the display section 14 subject to the calibration, having respectively different colors which are represented by all of the RGB values obtained by any varying combinations of three color component values (e.g. 0, 128, and 255). For example, measurements are performed on the 27 color patches having respectively different 27 colors (3×3×3=27), which are (0, 0, 0), (0, 0, 128), (0, 128, 128), (128, 0, 0), . . . , (255, 255, 255). This makes it possible to accurately perform fine color non-uniformity correction.

Note that, with the measurements performed using color patches, which are displayed on the display section 14, having respectively different colors represented by all of the RGB values which can be set by varying combinations of five color component values, 0, 64, 128, 192, and 255, it is possible to perform the non-uniformity correction with a higher degree of accuracy. This, however, requires the measurements to be performed 125 times, using 125 color patches, which are displayed on the display section 14, having respectively different 125 colors (5×5×5=125). It is a time-consuming task and is therefore not practical. Considering a balance between the overall time for the measurements and the degree of accuracy of the non-uniformity correction, the measurements using 27 color patches having respectively different 27 colors are preferably performed.

It should be noted that the combination of the three color component values to be selected is not limited to the combination of 0, 128, and 255. Alternatively, a combination of 16, 128, and 240, a combination of 32, 128, and 224, or any other combinations may be employed.

In addition to the color patches having respectively different 27 colors, another color patches may be added without any problem, as long as the colors of the additional color patches are some different colors. Accordingly, some color patches of particular colors selected from greyish colors, which are not the 27 colors, may be additionally provided. A choice of these additional greyish colors depends on originally selected three color component values that serve as a basis of the 27 colors. For example, in a case where color patches of 27 colors are prepared with use of three color component values, 0, 128, and 255, the additional color patches may be color patches having respectively different two colors corresponding to (64, 64, 64) and (192, 192, 192). Alternatively, the additional color patches may be color patches having respectively different six colors corresponding to (32, 32, 32), (64, 64, 64), (96, 96, 96), (160, 160, 160), (192, 192, 192), and (224, 224, 224). Further, even in a case where the three color component values that serve as a basis of the 27 colors is in the combination of 16, 128, and 240 or in the combination of 32, 128, and 224, the additional color patches may be provided in a similar manner. In this arrangement, two or six colors are added to the 27 colors. This increases only a small number of measurements and leads to improvement in accuracy. The additional colors may be specific colors that are particularly desired for adjustment. Examples of the specific colors encompass special colors including a skin color and a symbolic color of a specific entity such as a county and a company.

(Calculation of Adjustment Value)

Next, the following will specifically describe a method for calculating the adjustment value by using the reference data and the measurement data. The calculation of the adjustment value is performed by the adjustment value calculating section 44 illustrated in FIG. 2.

For example, assume that the display calibration system 1 has a look-up table (LUT) as the reference data held in the memory 55, wherein the LUT has 729 (9×9×9) RGB values and their respective XYZ values (reference values) associated with the RGB values, as illustrated in FIG. 7A. In addition, assume that color patches of colors (3×3×3=27 colors) corresponding to all of the RGB values set by any varying combinations of the color component values, 32, 128, and 224 are displayed for the measurements. Under the above assumptions, the following will describe a process for calculating the adjustment value with respect to the measurement data obtained based on a color patch corresponding to (224, 224, 224) (i.e. a process of calculating the adjustment value corresponding to the input color component value (224, 224, 224)).

Figure 8A:
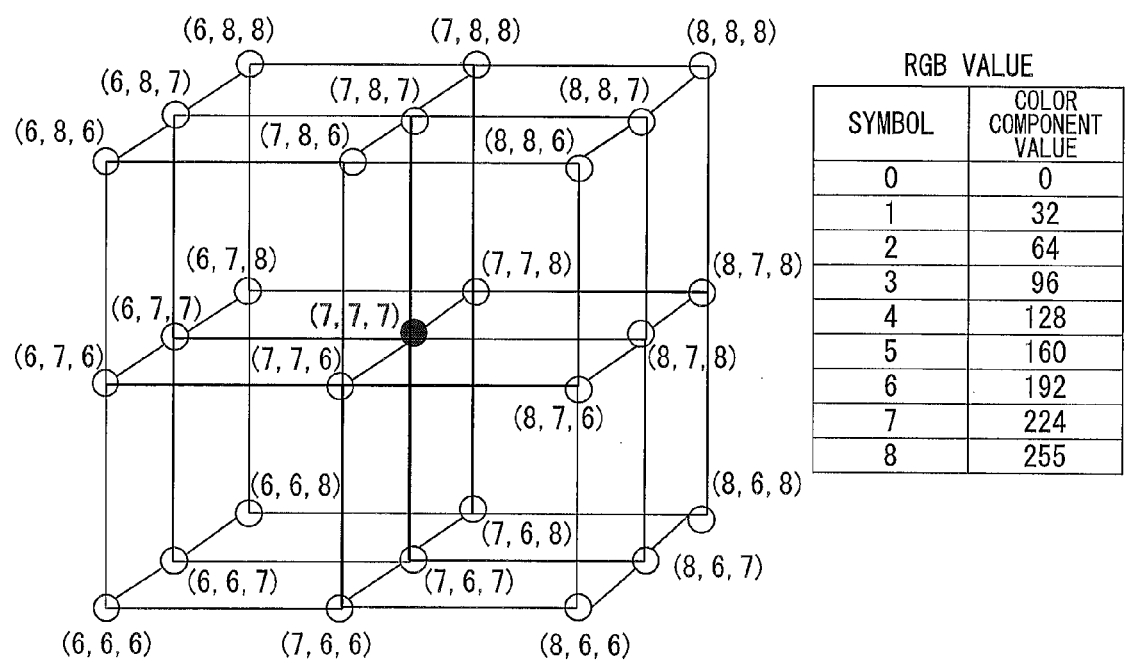
FIG. 8A is a diagram illustrating a part of the color space of FIG. 6.

FIG. 8A illustrates a color space in which a R value, a G value, a B value are each varied in a range from −32 to +32 with respect to the RGB value (224, 224, 224). Note that a point (7, 7, 7) on the color space corresponds to the RGB value (224, 224, 224). Non-uniformity correction is usually performed in the following manner. If color non-uniformity occurs for each pixel in a displayed image of the color patch representing the RGB value (224, 224, 224), a RGB value of a pixel having a lower measurement value (i.e. a darker pixel) is corrected so as to be increased to, for example, (229, 226, 230), while a RGB value of a pixel having a higher measurement value (i.e. a brighter pixel) is corrected so as to be decreased to, for example, (218, 219, 220). That is, a low degree of display non-uniformity can be corrected within the range given in the color space of FIG. 8A. The following will describe a method for calculating the adjustment value in the above case.

For example, as illustrated in FIG. 7B, assume that the reference data is such that the XYZ value is (557.9, 562.1, 843.3) for the RGB value (224, 224, 224) and that the XYZ value is (405.7, 406.8, 620.1) for the RGB value (192, 192, 192). Under the assumption, in a case where the measurement value of measurement data obtained by measurement on a displayed color patch of the RGB value (224, 224, 224) satisfies the conditions of $405.7 \leq X \leq 557.9$, $406.8 \leq Y \leq 562.1$, and $620.1 \leq Z \leq 843.3$, the measurement value corresponds to any of the RGB values within the color space illustrated in FIG. 8B. Here, assume that the obtained measurement value is (Xa, Ya, Za) in FIG. 8C. If (Ra, Ga, Ba) can be determined as the RGB value corresponding to (Xa, Ya, Za), the adjustment values are determined by the following equations:

Adjustment value for $R=224-Ra$    Equation D1;

Adjustment value for $G=224-Ga$    Equation D2; and

Adjustment value for $B=224-Ba$    Equation D3.

Here, RGB values as specified in the CIERGB color system, which is a colorimetric system defined by the CIE (Commission Internationale de l'Eclairage), or RGB values as specified in the sRGB color system, which is an international standard, can be transformed into XYZ values by using a predetermined 3×3 matrix that specifies coefficients.

However, in the case of the RGB values displayed on a display, a transformation cannot be made exactly due to various factors (for example, in the case of a liquid crystal display, a spectrum of a light source, filter characteristics, etc.) even when the transformation is made with a predetermined matrix that specifies coefficients.

In view of this, the following transformation can be considered. That is, the display devices 10 of the same model, which have similar characteristics, are preconfigured to retain representative reference data provided for their model, and a transformation matrix conforming to the characteristics of the reference data is used for the transformation. This enables a display-by-display transformation. In the present embodiment, the reference data is generated for each model, and the reference data provided for the model of the display which is included in the display device 10 is held in the memory 55, so that a matrix used for transformation is generated according to the reference data (That is, the reference data provided for the model of the display which constitutes the display section 14 needs to be held in the memory 55.). The following will describe the transformation using the matrix.

Information obtained as a variation of display non-uniformity to determine the adjustment value is the measurement value (XYZ value) for each pixel. From the measurement value, the adjustment value is determined. The RGB values are not limited to the above-specified RGB values. As long as coefficients of a 3×3 matrix can be changed so as to conform to the characteristics of the display device 10, the adjustment value can be determined by the following Equation 1:

$$\begin{pmatrix} R \\ G \\ B \end{pmatrix} = \begin{pmatrix} a & b & c \\ d & e & f \\ g & h & i \end{pmatrix} \cdot \begin{pmatrix} X \\ Y \\ Z \end{pmatrix} \quad \text{Equation 1}$$

More specifically, coefficients (a to i) (transformation coefficients) of the 3×3 matrix are determined based on the reference data corresponding to the model of the display device 10 subject to the calibration. Then, the XYZ values obtained by the measurements can be transformed into RGB values with use of the coefficients (a to i). In order to determine the coefficients (a to i), three pieces of data are required for a R value, a G value, and a B value each. This can be considered as given in Equation 2:

$$\begin{pmatrix} R1 & R2 & R3 \\ G1 & G2 & G3 \\ B1 & B2 & B3 \end{pmatrix} = \begin{pmatrix} a & b & c \\ d & e & f \\ g & h & i \end{pmatrix} \cdot \begin{pmatrix} X1 & X2 & X3 \\ Y1 & Y2 & Y3 \\ Z1 & Z2 & Z3 \end{pmatrix} \quad \text{Equation 2}$$

Figure 8B:
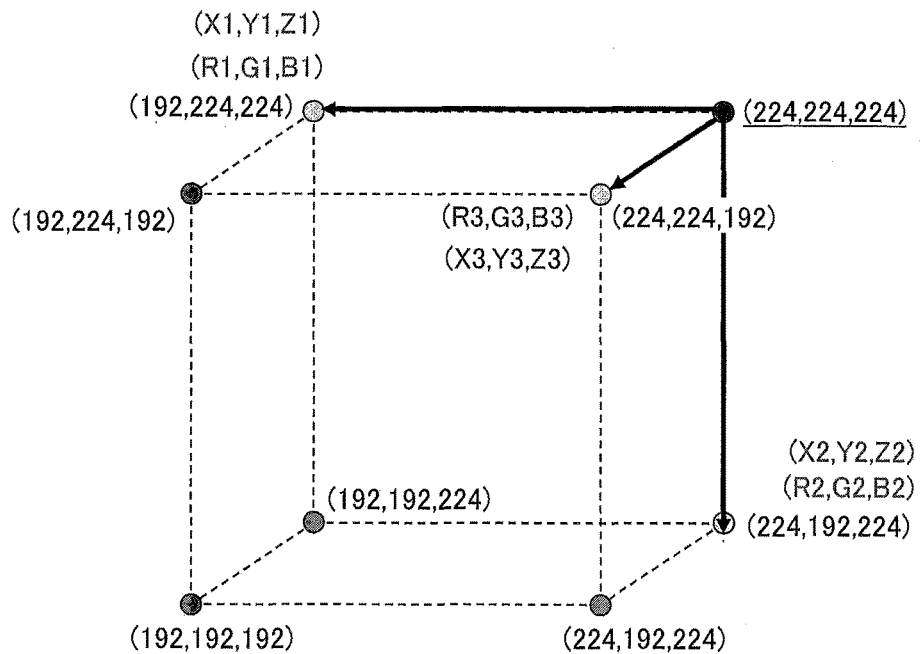
FIG. 8B is a diagram illustrating a part of the color space of FIG. 8A.

Assuming that the value of the reference data for the RGB value (R1, G1, B1) is (X1, Y1, Z1), that the value of the reference data for the RGB value (R2, G2, B2) is (X2, Y2, Z2), and that the value of the reference data for the RGB value (R3, G3, B3) is (X3, Y3, Z3), and that (R1, G1, B1)=(192, 224, 224), (R2, G2, B2)=(224, 192, 224), and (R3, G3, B3)=(224, 224, 192) as illustrated in FIG. 8B, the values of (R1, G1, B1) to (R3, G3, B3) and the values of (X1, Y1, Z1) to (X3, Y3, Z3), which are read from the reference data illustrated in FIG. 7B, are substituted into Equation 3:

$$\begin{pmatrix} a & b & c \\ d & e & f \\ g & h & i \end{pmatrix} = \begin{pmatrix} R1 & R2 & R3 \\ G1 & G2 & G3 \\ B1 & B2 & B3 \end{pmatrix} \cdot \begin{pmatrix} X1 & X2 & X3 \\ Y1 & Y2 & Y3 \\ Z1 & Z2 & Z3 \end{pmatrix}^{-1} \quad \text{Equation 3}$$

This yields the coefficients (a to i).

Figure 8C:
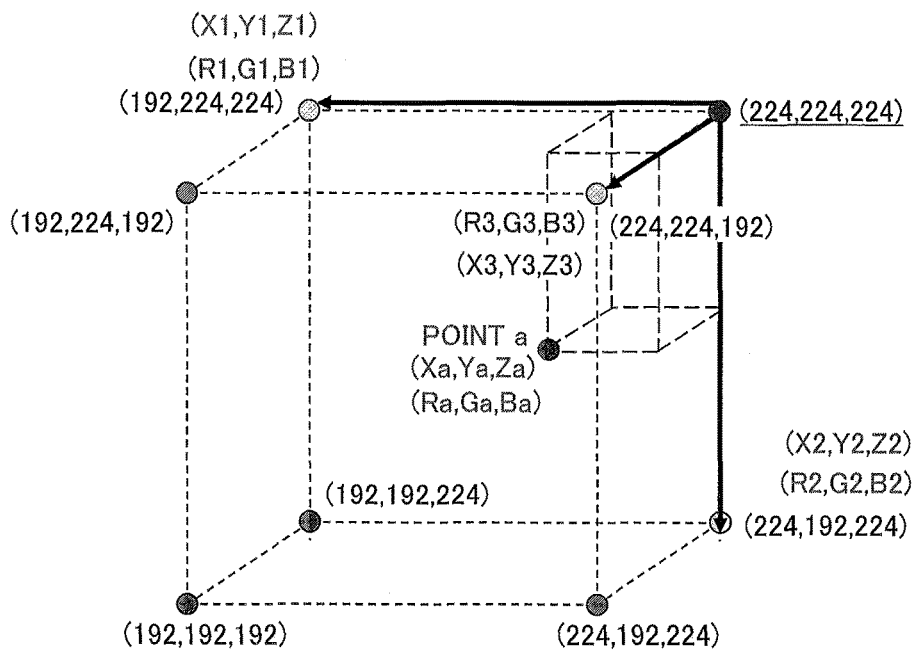
FIG. 8C is a diagram illustrating the existence of a point indicating the measurement value in the color space of FIG. 8B.

Substituting the obtained coefficients into Equation 1 and substituting the measurement value (X, Y, Z) for each pixel into Equation 1 yields (Ra, Ga, Ba), which is a RGB value of a point a in FIG. 8C. Then, substituting Ra, Ga, and Ba into Equations D1, D2, and D3, respectively, yields the adjustment values.

In the above case, the coefficients of the matrix were determined by using Equation 2. Alternatively, for the non-uniformity correction with a higher degree of accuracy, the coefficients of the matrix may be determined by using a difference between the reference value of the reference data and the measurement value. In this case, Equation 2 is transformed into Equation 4:

$$\begin{pmatrix} \Delta R1 & \Delta R2 & \Delta R3 \\ \Delta G1 & \Delta G2 & \Delta G3 \\ \Delta B1 & \Delta B2 & \Delta B3 \end{pmatrix} = \begin{pmatrix} a' & b' & c' \\ d' & e' & f' \\ g' & h' & i' \end{pmatrix} \cdot \begin{pmatrix} \Delta X1 & \Delta X2 & \Delta X3 \\ \Delta Y1 & \Delta Y2 & \Delta Y3 \\ \Delta Z1 & \Delta Z2 & \Delta Z3 \end{pmatrix} \quad \text{Equation 4}$$

First, coefficients (a' to i') of Equation 4 are determined in the same manner that the coefficients were determined by using Equation 2. In this case, ($\Delta R1$, $\Delta G1$, $\Delta B1$) is (224−R1, 224−G1, 224−B1). Here, (R1, G1, B1)=(192, 224, 224) in FIG. 8B. Accordingly, ($\Delta R1$, $\Delta G1$, $\Delta B1$)=(224−192, 224−224, 224−224), i.e. ($\Delta R1$, $\Delta G1$, $\Delta B1$)=(32, 0, 0). ($\Delta R2$, $\Delta G2$, $\Delta B2$) and ($\Delta R3$, $\Delta G3$, $\Delta B3$) are determined in the same manner. That is, ($\Delta R2$, $\Delta G2$, $\Delta B2$)=(0, 32, 0) and ($\Delta R3$, $\Delta G3$, $\Delta B3$)=(0, 0, 32). In this case, the matrix on the left-hand side in Equation 4 is actually equal to a 32-fold multiplication of a unit matrix.

Further, ($\Delta X1$, $\Delta Y1$, $\Delta Z1$) is a difference between the XYZ value for the RGB value (224, 224, 224) and (X1, Y1, Z1), and then ($\Delta X1$, $\Delta Y1$, $\Delta Z1$)=(557.9−X1, 562.1−Y1, 843.3−Z1). ($\Delta X2$, $\Delta X2$, $\Delta X2$) and ($\Delta X3$, $\Delta X3$, $\Delta X3$) are determined in the same manner. That is, ($\Delta X2$, $\Delta Y2$, $\Delta Z2$)=(557.9−X2, 562.1−Y2, 843.3−Z2), ($\Delta X3$, $\Delta Y3$, $\Delta Z3$)=(557.9−X3, 562.1−Y3, 843.3−Z3). The values (X1, Y1, Z1) to (X3, Y3, Z3) are read from the reference data illustrated in FIG. 7B. The coefficients (a' to i') of Equation 4 can be determined from the following Equation 5:

$$\begin{pmatrix} a' & b' & c' \\ d' & e' & f' \\ g' & h' & i' \end{pmatrix} = \begin{pmatrix} \Delta R1 & \Delta R2 & \Delta R3 \\ \Delta G1 & \Delta G2 & \Delta G3 \\ \Delta B1 & \Delta B2 & \Delta B3 \end{pmatrix} \cdot \begin{pmatrix} \Delta X1 & \Delta X2 & \Delta X3 \\ \Delta Y1 & \Delta Y2 & \Delta Y3 \\ \Delta Z1 & \Delta Z2 & \Delta Z3 \end{pmatrix}^{-1} \quad \text{Equation 5}$$

It should be noted that the difference values such as $\Delta R1$ and $\Delta X1$ are not necessarily positive values and may be negative values. However, the difference values are basically positive values, unless the measurement data includes values in error or the like. This is because the different values are each obtained by subtraction between the same values or by subtraction of a lower value from a higher value.

Substituting the coefficients (a' to i') determined from Equation 5 into (a to i) of Equation 1 yields a difference between the XYZ value (557.9, 562.1, 843.3), as the reference data (basic data), for the RGB value (224, 224, 224) and the measurement value (XYZ value) obtained for the RGB value (224, 224, 224) of the color patch. Then, the difference is substituted into (X, Y, Z) of Equation 1. In this manner, the adjustment values can be directly determined.

In order to further increase the accuracy of the non-uniformity correction, a matrix including a higher order term (herein, a second-order term) may be employed. A transformation equation using a 3×9 matrix is represented by, for example, the following Equation 6:

$$\begin{pmatrix} R \\ G \\ B \end{pmatrix} = \begin{pmatrix} a1 & a2 & a3 & a4 & a5 & a6 & a7 & a8 & a9 \\ b1 & b2 & b3 & b4 & b5 & b6 & b7 & b8 & b9 \\ c1 & c2 & c3 & c4 & c5 & c6 & c7 & c8 & c9 \end{pmatrix} \cdot \begin{pmatrix} X \\ Y \\ Z \\ X1^{\wedge}2 \\ Y1^{\wedge}2 \\ Z1^{\wedge}2 \\ X1\,Y1 \\ Y1\,Z1 \\ Z1\,X1 \end{pmatrix} \quad \text{Equation 6}$$

As in the above case, the coefficients of the matrix can be calculated by using Equations 7 and 8:

Equation 7

$$\begin{pmatrix} R1 & R2 & R3 & R4 & R5 & R6 & R7 & R8 & R9 \\ G1 & G2 & G3 & G4 & G5 & G6 & G7 & G8 & G9 \\ B1 & B2 & B3 & B4 & B5 & B6 & B7 & B8 & B9 \end{pmatrix} =$$

$$\begin{pmatrix} a1 & a2 & a3 & a4 & a5 & a6 & a7 & a8 & a9 \\ b1 & b2 & b3 & b4 & b5 & b6 & b7 & b8 & b9 \\ c1 & c2 & c3 & c4 & c5 & c6 & c7 & c8 & c9 \end{pmatrix} \cdot \begin{pmatrix} X1 & X2 & X3 & X4 & X5 & X6 & X7 & X8 & X9 \\ Y1 & Y2 & Y3 & Y4 & Y5 & Y6 & Y7 & Y8 & Y9 \\ Z1 & Z2 & Z3 & Z4 & Z5 & Z6 & Z7 & Z8 & Z9 \\ X1^{\wedge}2 & X2^{\wedge}2 & X3^{\wedge}2 & X4^{\wedge}2 & X5^{\wedge}2 & X6^{\wedge}2 & X7^{\wedge}2 & X8^{\wedge}2 & X9^{\wedge}2 \\ Y1^{\wedge}2 & Y2^{\wedge}2 & Y3^{\wedge}2 & Y4^{\wedge}2 & Y5^{\wedge}2 & Y6^{\wedge}2 & Y7^{\wedge}2 & Y8^{\wedge}2 & Y9^{\wedge}2 \\ Z1^{\wedge}2 & Z2^{\wedge}2 & Z3^{\wedge}2 & Z4^{\wedge}2 & Z5^{\wedge}2 & Z6^{\wedge}2 & Z7^{\wedge}2 & Z8^{\wedge}2 & Z9^{\wedge}2 \\ X1\,Y1 & X2\,Y2 & X3\,Y3 & X4\,Y4 & X5\,Y5 & X6\,Y6 & X7\,Y7 & X8\,Y8 & X9\,Y9 \\ Y1\,Z1 & Y2\,Z2 & Y3\,Z3 & Y4\,Z4 & Y5\,Z5 & Y6\,Z6 & Y7\,Z7 & Y8\,Z8 & Y9\,Z9 \\ Z1\,X1 & Z2\,X2 & Z3\,X3 & Z4\,X4 & Z5\,X5 & Z6\,X6 & Z7\,X7 & Z8\,X8 & Z9\,X9 \end{pmatrix}$$

and

Equation 8

$$\begin{pmatrix} a1 & a2 & a3 & a4 & a5 & a6 & a7 & a8 & a9 \\ b1 & b2 & b3 & b4 & b5 & b6 & b7 & b8 & b9 \\ c1 & c2 & c3 & c4 & c5 & c6 & c7 & c8 & c9 \end{pmatrix} =$$

-continued $$\begin{pmatrix} R1 & R2 & R3 & R4 & R5 & R6 & R7 & R8 & R9 \\ G1 & G2 & G3 & G4 & G5 & G6 & G7 & G8 & G9 \\ B1 & B2 & B3 & B4 & B5 & B6 & B7 & B8 & B9 \end{pmatrix} \cdot \begin{pmatrix} X1 & X2 & X3 & X4 & X5 & X6 & X7 & X8 & X9 \\ Y1 & Y2 & Y3 & Y4 & Y5 & Y6 & Y7 & Y8 & Y9 \\ Z1 & Z2 & Z3 & Z4 & Z5 & Z6 & Z7 & Z8 & Z9 \\ X1^2 & X2^2 & X3^2 & X4^2 & X5^2 & X6^2 & X7^2 & X8^2 & X9^2 \\ Y1^2 & Y2^2 & Y3^2 & Y4^2 & Y5^2 & Y6^2 & Y7^2 & Y8^2 & Y9^2 \\ Z1^2 & Z2^2 & Z3^2 & Z4^2 & Z5^2 & Z6^2 & Z7^2 & Z8^2 & Z9^2 \\ X1\,Y1 & X2\,Y2 & X3\,Y3 & X4\,Y4 & X5\,Y5 & X6\,Y6 & X7\,Y7 & X8\,Y8 & X9\,Y9 \\ Y1\,Z1 & Y2\,Z2 & Y3\,Z3 & Y4\,Z4 & Y5\,Z5 & Y6\,Z6 & Y7\,Z7 & Y8\,Z8 & Y9\,Z9 \\ Z1\,X1 & Z2\,X2 & Z3\,X3 & Z4\,X4 & Z5\,X5 & Z6\,X6 & Z7\,X7 & Z8\,X8 & Z9\,X9 \end{pmatrix}^{-1}$$

In this manner, the adjustment value corresponding to the RGB value (input color component value) of the color patch can be determined for each pixel. As for a method of determining coefficients by using a matrix including a higher order term as in Equations 6 to 8, differences may be used as in Equation 4.

The above calculation using the reference values (reference data) corresponding to the three points (R1, G1, B1) to (R3, G3, B3), illustrated in FIG. 8B, can be performed in a case where a point representing the measurement value is contained within a color space of FIG. 8B, which defines the RGB value (192, 192, 192) as the lowest value and the RGB value (244, 244, 244) as the highest value.

Figure 8D:
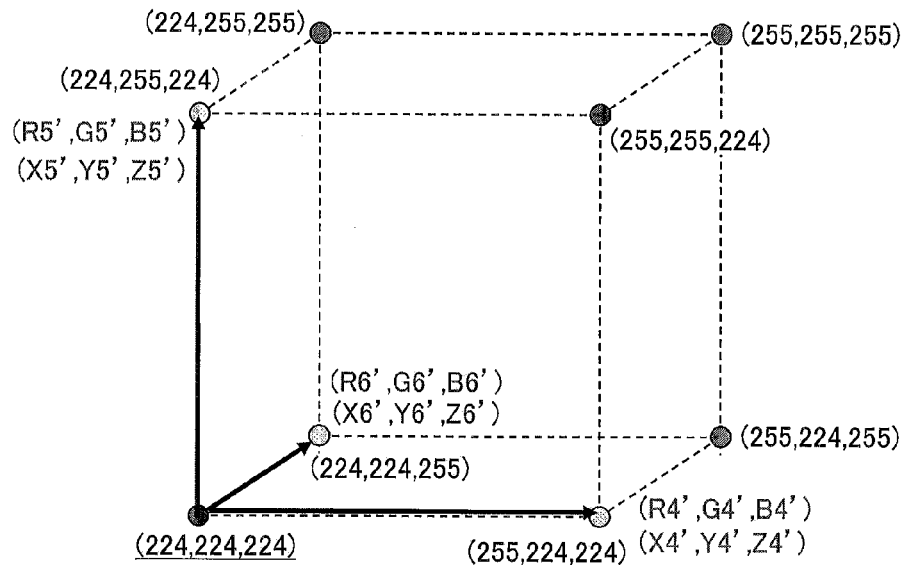
FIG. 8D is a diagram illustrating another part of the color space of FIG. 8A, which part is different from the part illustrated in FIG. 8B.

On the contrary, assuming that the point representing the measurement value is not contained within the color space of FIG. 8B, more specifically, that the point representing the measurement value falls within a range from the XYZ value (557.9, 562.1, 843.3) for the RGB value (224, 224, 224) and the XYZ value (718.2, 723.7, 1089) for the RGB value (255, 255, 255), for example, as illustrated in FIG. 8D (that is, assuming that the measurement value is (557.9≤X≤718.2, 562.1≤Y≤723.7, 843.3≤Z≤1089).). In this case, a calculation may be performed in a manner similar to the above case, by using a matrix that defines values (reference values) of reference data corresponding to three points (R4', G4', B4'), (R5', G5', B5'), and (R6', G6', B6') illustrated in FIG. 8D as (X4', Y4', Z4'), (X5', Y5', X5'), and (X6', Y6', X6') respectively.

Figure 8E:
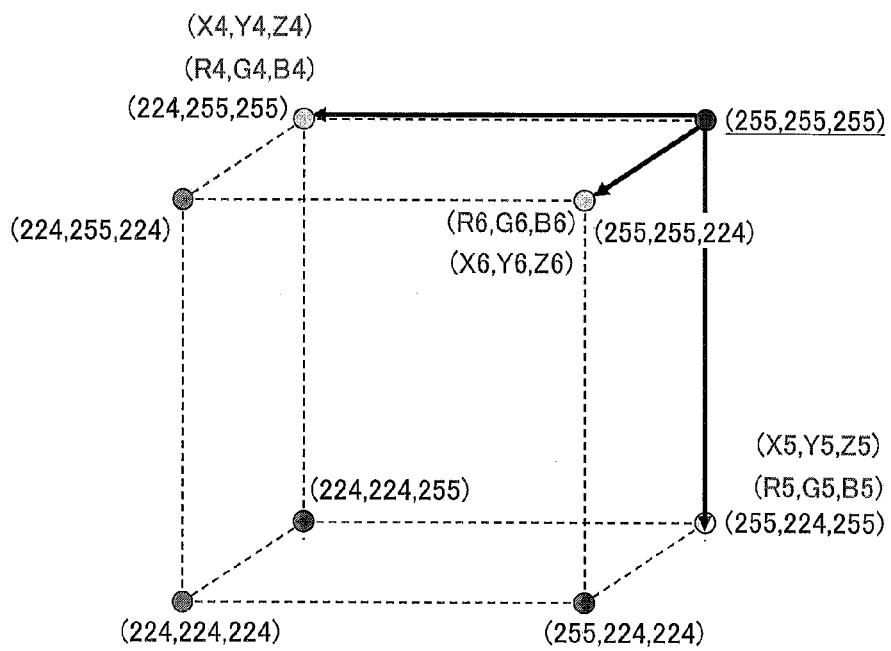
FIG. 8E is a diagram illustrating a color space that is the same as the color space of FIG. 8D, and explaining that an adjustment value is determined by using three reference values provided around RGB=(255, 255, 255).

The example illustrated in FIG. 8D uses the values of the reference data corresponding to the three points (R4', G4', B4'), (R5', G5', B5'), and (R6', G6', B6') because the point representing the RGB value (224, 224, 224) is used as a reference point so that the three points provided around the point representing the RGB value (224, 224, 224) are referenced to. Alternatively, the reference point may be the point corresponding to the RGB value (225, 225, 225), as illustrated in FIG. 8E. In the example illustrated in FIG. 8E, a calculation may be performed in a manner similar to the above case, by using a matrix that defines values of reference data corresponding to three points (R4, G4, B4), (R5, G5, B5), and (R6, G6, B6) as (X4, Y4, Z4), (X5, Y5, X5), and (X6, Y6, X6).

It should be noted that the methods illustrated in FIGS. 8D and 8E, either one of which can be employed, increase the accuracy if defining, as the reference point, a point closer to the measurement value (XYZ value), which point is selected from points corresponding to the following XYZ values: the XYZ value (557.9, 562.1, 843.3) corresponding to the RGB value (224, 224, 224) and the XYZ value (718.2, 723.7, 1089) corresponding to the RGB value (225, 225, 225). In other words, each of the color spaces illustrated in FIGS. 8D and 8E is in the form of a cube, which has eight apexes in total, and an apex located at a position that is the closest to the measurement value is defined as the reference point.

In the above cases, on the assumption that display non-uniformity does not vary so widely, a study was made on the measurement value falling within the range illustrated in FIG. 8A (measurement value obtained by the measurement on the color patch of the color corresponding to the RGB value (224, 224, 224)). However, in a case where display non-uniformity varies widely, the measurement value can fall outside the range illustrated in FIG. 8A. In such a case, a maximum apex (Rmax, Gmax, Bmax) and a minimum apex (Rmin, Gmin, Bmin) are detected in blocks covering ranges other than the range illustrated in FIG. 8A (The maximum apex is a combination of the highest R value, the highest G value, and the highest B value in the block, and the minimum apex is a combination of the lowest R value, the lowest G value, and the lowest B value in the block. For example, in the block of FIG. 8B, the point (192, 192, 192) is the minimum apex, and the point (224, 224, 224) is the maximum apex.). Subsequently, respective values (XYZ values) of the reference data are detected corresponding to the maximum apex and the minimum apex, a block in which the measurement value (XYZ value) falls between the maximum apex and the minimum apex is detected, matrix coefficients are determined by using the values in the block, and adjustment values are calculated by using the obtained matrix coefficients.

As a matter of course, in a case where a block containing a measurement value obtained by measurement on a color patch representing the RGB value (224, 224, 224) has a maximum apex (192, 192, 192) and a minimum apex (160, 160, 160), not only the adjustment value determined by calculation based on this block, but also (32, 32, 32), which is a difference between (224, 224, 224) and (192, 192, 192), need to be taken into consideration as the adjustment value.

The setting of the reference data (FIGS. 7A and 7B) used for calculation of the adjustment value, can be made by various methods. However, some of the methods can cause the measurement value to exceed a maximum value of the reference data, with the result that a failure in detection of a corresponding block occurs (If the average of the measurement values obtained by the measurement performed to generate the reference data is used as the reference data, the measurement value obtained for the color patch of a color corresponding to a maximum RGB value, for example, can exceed the reference data.).

In order to prevent the occurrence of such an event, it is safe to select a block located at a position which is the closest to the point of the measurement value, although the point of the measurement value may be located outside the range covered by the block. It should be noted that the maximum RGB value is 255. Accordingly, a post-correction value is saturated at 255 even in a case where it exceeds 255.

Further, there is some possibility that the adjustment value determined through the measurement on the displayed image of the color patch of the color corresponding to (R, G, B)=(224, 224, 224) can be 32 or greater, depending upon a pixel. For example, assuming that the adjustment value is 40, a post-correction color component value corresponding to the input color component value of 224 becomes 264 (224+40=264). However, since 8 bits can represent 0 to 255 only, an upper limit value of the adjustment value needs to be set so that the maximum value of the adjustment value becomes 31 (255−224=31). Further, the adjustment value determined through the measurement on the displayed image of the color patch of the color corresponding to (R, G, B)=(225, 225, 225) needs to be set to 0. This is because a post-correction color component value corresponding to the input color component value (R, G, B)=(225, 225, 225) cannot take a value greater than 225. Similarly, the adjustment value determined through the measurement on a displayed image of the color patch of the color corresponding to (R, G, B)=(0, 0, 0) needs to be set to 0 or greater. This is because a post-correction color component value corresponding to the input color component value (R, G, B)=(0, 0, 0) cannot take a value less than 0.

As a matter of course, in a case where the RGB value of the color patch is (0, 128, 255), the adjustment values for R, G, B need to be set so that post-correction color component values for R, G, B can take values in a range from 0 to 255, in such a manner that the adjustment value for R is set to a value in a range from 0 to 255, the adjustment value for G is set to a value in a range from −128 to 127, and the adjustment value for B is set to a value in a range from −255 to 0. This enables all of the R value, the G value, and the B value and all of the input color component values to take values in the range from 0 to 255 even after the correction.

(Non-Uniformity Correction)

In the manner as described above, the adjustment values for each of the color patches of 27 colors are determined for each pixel. For example, assume that measurements are performed on displayed images of color patches respectively corresponding to 27 types of pieces of color information (varying combinations of the R values, G values, and B values) obtainable by varying combinations of three color component values, 0, 128, and 255. In this case, as for RGB values (pieces of color information) corresponding to 27 grid points on a grid illustrated in FIG. 10, their adjustment values are determined for each pixel (3×3×3=27).

Then, the adjustment value calculating section 44 generates adjustment value information (correction data) that represents correspondences between the 27 types of pieces of color information (RGB values) and their respective adjustment values. The adjustment value information is generated for each pixel.

That is, the adjustment value information represents, not adjustment values of pieces of color information of all types displayable by the display section 14 (256×256×256≈16,770,000), but the adjustment values of the 27 types of pieces of color information only.

Figures 10, 11:
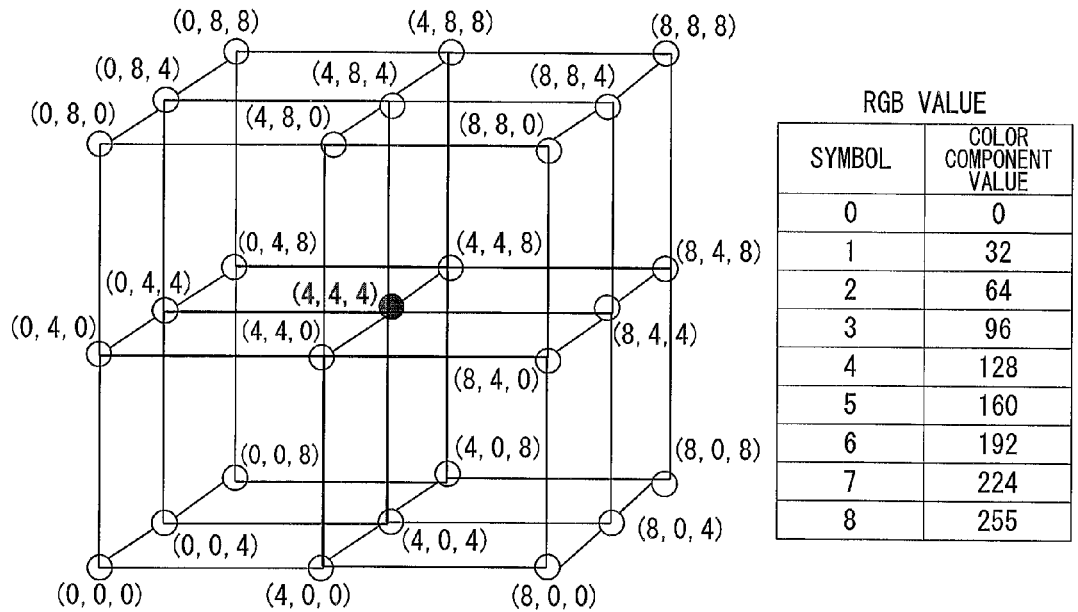
FIG. 10 is a diagram illustrating grid points corresponding to 27 types of input RGB values represented in the adjustment value information (correction-use LUT).
FIG. 11 is a view illustrating adjustment value information.

For example, data illustrated in FIG. 11 corresponds the adjustment value information for one (1) pixel. That is, the adjustment value information represents the respective adjustment values of the color component values of the 27 types of pieces of color information (varying combinations of the R values, G values, and B values). Each of the pieces of color information has three color component values, and the adjustment value information for one (1) pixel is the data containing 81 adjustment values (3×27=81) as illustrated in FIG. 11.

In the present embodiment, the adjustment value information is stored, in the form of a correction-use LUT, in the storage section 26, so that the non-uniformity correcting section 36 illustrated in FIG. 1 references to the correction-use LUT to perform the non-uniformity correction. Specifically, the non-uniformity correction is performed in the following manner.

In a case where the input value is one of the pieces of color information corresponding to 27 types of grid points in FIG. 10, i.e. in a case where the input value is one of the pieces of color information (RGB values) shown in the correction-use LUT, the non-uniformity correcting section 36 reads the adjustment values corresponding to that piece of color information from the correction-use LUT and then performs color component correction using the read adjustment values.

On the other hand, in a case where the input value is color information other than the pieces of color information corresponding to 27 types of grid points in FIG. 10, i.e. in a case where the input value is color information other than the pieces of color information shown in the correction-use LUT, the non-uniformity correcting section 36 (i) detects grid points (in FIG. 10) which are located close to the position representing the input value, (ii) performs interpolation using the adjustment values corresponding to the detected grid points to determine the adjustment values for the input value, and then (iii) performs color component correction using the adjustment values. That is, the non-uniformity correcting section 36 interpolates the adjustment values shown in the correction-use LUT to determine the adjustment values for the input value. The interpolation performed in the above case may be linear interpolation, spline interpolation, tetrahedral interpolation, or the like interpolation method.

In this case, performing measurements in advance on any other pieces of color information (e.g. the RGB values (64, 64, 64) and (192, 192, 192)), as well as the pieces of color information corresponding to the 27 types of grid points, can lead to an increase in degree of accuracy in non-uniformity correction. For example, comparison is performed between (i) an adjustment value of the RGB value (64, 64, 64), which adjustment value is determined by calculation based on adjustment values of pieces of color information of eight types (2×2×2=8), which are the RGB values obtained by varying combinations of 0 and 128, and (ii) an adjustment value determined based on data obtained by measurements on the additional RGB value (64, 64, 64). If the comparison determines that the (a) adjustment value is much the same as the (b) adjustment value, the determination indicates that the interpolation method based on the grid points is a proper method. However, if the comparison determines that there is a difference between the (a) adjustment value and the (b) adjustment value, the determination indicates the interpolation method based on the grid points is not a proper method. Hence, the interpolation method is changed to another for a higher degree of accuracy in non-uniformity correction. For example, assumes that pieces of color information representing greyish colors are additionally employed. In this case, the spline interpolation based on adjustment values for the five points (0, 0, 0), (64, 64, 64), (128, 128, 128), (192, 192, 192), and (255, 255, 255) leads to a higher degree of accuracy in non-uniformity correction than the interpolation based on the adjustment values for the three points (0, 0, 0), (128, 128, 128), and (255, 255, 255). As a matter of course, the greater the number of points targeted for the measurements, the higher the degree of accuracy in non-uniformity correction. However, a mere increase in number of points targeted for the measurements is not necessary. Instead, only several points representing greyish colors need to be added to the 27 types of grid points. The addition of the points (64, 64, 64) and (192, 192, 192) as the grid points to the 27 types of grid points as described above results in 29 types of grid points in total. Further, to these 29 types of grid points, the points (32, 32, 32), (96, 96, 96), (160, 160, 160), and (224, 224, 224) may be further added as the grid points. This results in only 33 types of grid points in total. Then, the adjustment values for the color information other than the pieces of color information corresponding to the grid points can be determined by interpolation based on the adjustment values corresponding to the grid points which have been determined from the measurement data.

Figure 9:
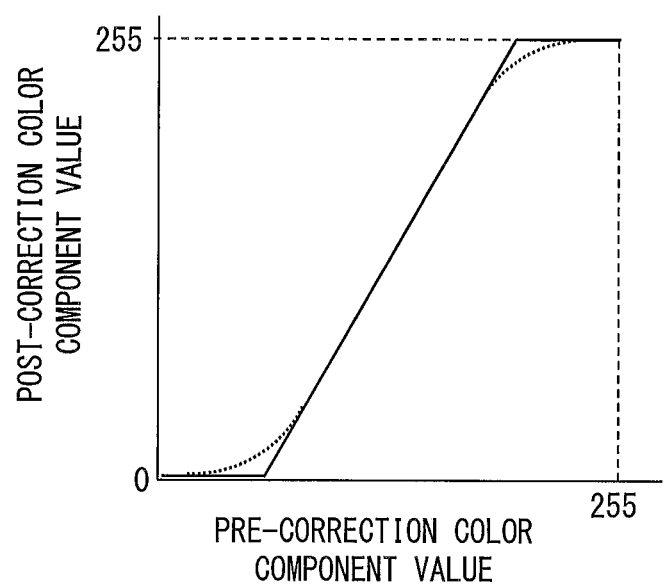
FIG. 9 is a graph illustrating a relation between input values and output values and showing a slightly changed gamma curve.

Meanwhile, assume that the adjustment value is 0 for the input color component value of 255, the adjustment value is 1 for the input color component value of 254, and the adjustment value is 2 for the input color component value of 253. In this case, an event occurs that their respective post-correction color component values become all 255. Such an event causes saturation of color components corresponding to some color component values, with the result that contrast is lost. In view of this, in order to prevent color non-uniformity without causing a loss of contrast, the adjustment values are determined in a manner provided below, although differing from required adjustment values because conformity in hue takes precedence. That is, by performing adjustments that the adjustment value is 0 for the input color component value of 255, the adjustment value is 1 for the input color component value of 254, and the adjustment value is 1 for the input color component value of 253, the post-correction color component value corresponding to the input color component value of 253 is 254 (253+1) although both of the post-correction color component values corresponding to the input color component values of 255 and 254 are 255. This enables slightly changed color components as illustrated in FIG. 9.

The adjustment value information illustrated in FIG. 11 represents the adjustment values for each of the pieces of color information obtainable by varying combinations of three color component values, 0, 128, and 255. However, the color component values constituting the color information are not limited to 0, 128, and 255. Alternatively, a combination of the color component values of 16, 128, and 240 or a combination of the color component values of 32, 128, and 224, or other combination may be selected. In a case where any of the alternative combinations of the color component values is selected, adjustment values for a color component value(s) other than the alternatively combined color component values are determined by interpolation, as in the case where the three color component values of 1, 128, and 255 are selected. In the event that that the post-correction color component values corresponding to the alternatively selected color component values are less than 0 or are greater than 255, adjustments can be performed so that the post-correction color component values fall within the range from 0 to 255.

(Generation of Map)

In order to have the storage section 26 to store therein the pieces of adjustment value information for all of the pixels in the form of the correction-use LUT, the adjustment values (81 pieces of data) for the 27 types of pieces of color information need to be stored in the storage section 26, for each pixel, i.e. 1920 pixels by 1080 pixels, for example. This results in an extremely large amount of data to be stored in the storage section 26. That is, from the viewpoint of cost and others, it is not practical to have the storage section 26 to store therein the pieces of adjustment value information for all of the pixels in the form of the correction-use LUT, even if the adjustment value information does not represent the adjustment values for all pieces of color information displayable on the display section 14. Instead, it is necessary to decrease the number of pieces of adjustment value information to be stored in the form of the correction-use LUT in the storage section 26.

In view of this, in the present embodiment, the map outputting section 45 divides the pieces of adjustment value information generated for each pixel of the display section 14 into 256 groups by performing a clustering process. Subsequently, the map outputting section 45 extracts respective pieces of adjustment value information (pieces of representative adjustment value information) from the groups (extracts one (1) piece of representative adjustment value information from one (1) group), compiles the pieces of representative adjustment value information as the correction-use LUTs into a non-uniformity correction map (see FIG. 12) containing 256 correction-use LUTs, and then cause the storage section 26 to store therein the non-uniformity correction map. As illustrated in FIG. 12, the non-uniformity correction map has identification numbers uniquely assigned to the correction-use LUTs.

Thereafter, the map outputting section 45 generates an index map (see FIG. 13) that represents the identification number of the correction-use LUT (the representative adjustment value information), for each of the pixels, extracted from the group to which the adjustment value information for that pixel belongs. Then, the map outputting section 45 causes the storage section 26 to store therein the index map as well.

Subsequently, the non-uniformity correcting section 36 refers to the index map stored in the storage section 26 to read the identification number of a pixel subject to the correction from the index map, and then reads a correction-use LUT corresponding to that identification number from the non-uniformity correction map stored in the storage section 26. The non-uniformity correcting section 36 then determines the adjustment values from the read correction-use LUT to perform correction of the color component value.

According to the above embodiment, the pieces of adjustment value information are divided into groups by performing the clustering process. For this reason, the pieces of adjustment value information which belong to the same group have a higher degree of similarity. Therefore, correction of a color component value for a pixel is performed, without using the adjustment value information for that pixel, by using the representative adjustment value information (correction-use LUT) that belongs to a group to which the adjustment value information for that pixel belongs. This means that the correction is performed with use of the representative adjustment value information having a similarity to (a small error from) the adjustment value information for that pixel. This makes it possible to maintain the accuracy of correction with an error in insignificant level (with an error that is not recognizable by human's eyes), without the necessity to hold all of the pieces of adjustment value information for all of the pixels in the storage section 26.

Further, according to the above embodiment, in a case where the display section 14 has 1920 pixels×1080 pixels, 1920×1080 pieces of adjustment value information are generated each representing the adjustment values (81 pieces of data) for the 27 types of pieces of color information. However, it is not necessary to store the 1920×1080 pieces of adjustment value information in the form of LUTs in the storage section 26. Instead, 256 pieces of adjustment value information are stored in the form of LUTs in the storage section 26. Storing the 256 pieces of adjustment value information in the form of the LUTs is not a problem in terms of data amount (that is, enables reduction of the amount of data to be stored.). Depending to the capacity of the storage section 26, the number of the correction-use LUTs to be held may be decreased to 128 or may be increased to 512, 1024, or other number.

Figure 21:
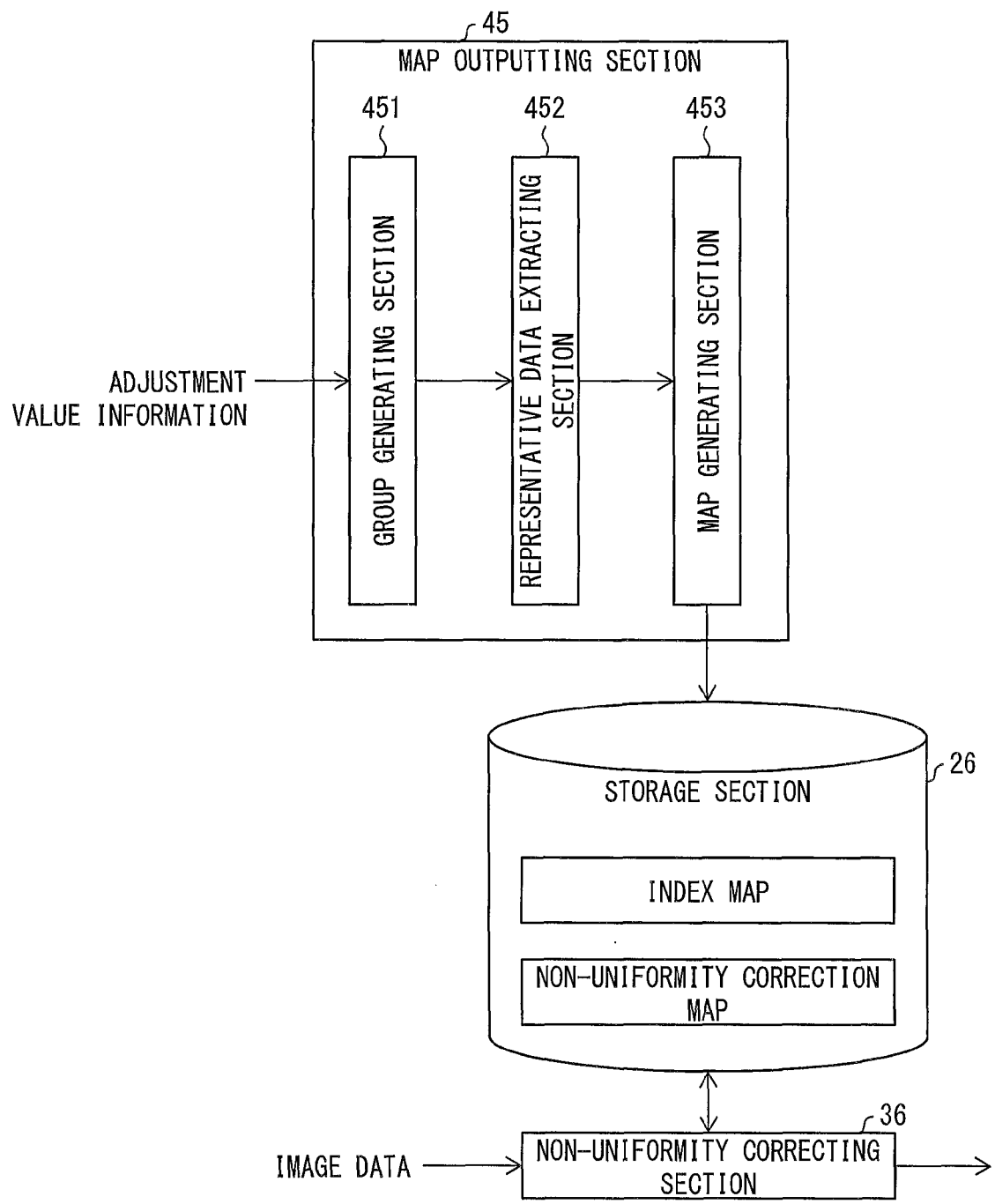
FIG. 21 is a block diagram illustrating a schematic configuration of the map outputting section illustrated in FIG. 2.

The following will describe details of the map outputting section 45 that generates the non-uniformity correction map (first table; correspondence information) and the index map (second table; correspondence information). The map outputting section 45, as illustrated in FIG. 21, includes a group generating section 451, a representative data extracting section 452, and a map generating section 453.

The group generating section 451 is a block configured to, upon receipt of the respective pieces of adjustment value information which have been generated for the individual pixels of the display section 14 from the adjustment value calculating section 44, divide these pieces of adjustment value information into 256 groups by performing a clustering process. The following will describe the clustering process.

FIG. 20 is an explanatory view illustrating the concept of the clustering process. For convenience of explanation, FIG. 20 illustrates the concept of the clustering process in a case where data subject to the clustering process is two-dimensional data. However, the clustering process performed in the present embodiment is practically clustering of 81-dimensional data because the adjustment value information subject to the clustering process is information consists of 81 adjustment values.

Assume that pieces of data subject to the clustering process are distributed as illustrated in a left-hand side view of FIG. 20. In this case, the data can be divided into seven groups, each of which is a collection of the pieces of data surrounded by a dashed-line circle, as illustrated in a right-hand side view of FIG. 20. In FIG. 20, a mark "x" indicates representative data extracted from each of the groups. The representative data is data located at a position corresponding to a centroid of each of the groups. That is, in FIG. 20, all the pieces of data (points) are divided into groups in such a manner that a distance of a certain piece of data from a centroid of one group to which that piece of data belongs is shorter than distances from centroids of the other groups. In the event that there exists any piece of data of which distance from a centroid of one group to which that piece of data belongs is longer than distances from centroids of the other groups, the division of all the pieces of data into groups is performed again and repeated, if necessary, until all the pieces of data of which distances from centroids of their groups become shorter than distances from centroids of the other groups. This enables combining pieces of adjustment value information having high similarity into one group (for example, the shorter Euclidean distance, the higher the degree of similarity between the pieces of adjustment value information). It should be noted that the clustering process can be implemented by various kinds of methods including the minimum distance method, the maximum distance method, the group average method, the Ward method, and the K-means method. An appropriate method for the clustering process can be therefore selected from among these methods.

The representative data extracting section (representative correction data outputting section) 452 is a block configured to extract, as the correction-use LUT, a piece of adjustment value information as a representative (referred to as "representative adjustment value information") from the pieces of adjustment value information contained in each of the groups generated by the group generating section 451. That is, the representative data extracting section 452 extracts one (1) piece of adjustment value information corresponding to the centroid mentioned earlier (representative correction data) from the pieces of adjustment value information contained in each of the groups to determine the extracted adjustment value information as the correction-use LUT to be held.

The map generating section 453 is a block configured to generate the non-uniformity correction map and the index map in accordance with processing results obtained by the group generating section 451 and the representative data extracting section 452, wherein a combination of the non-uniformity correction map and the index map represents correspondences between the individual pixels of the display section 14 and the correction-use LUTs extracted from the groups to which the respective pieces of adjustment value information for the individual pixels of the display section 14 belong.

The non-uniformity correction map, which is the table illustrated in FIG. 12, is a collection of the correction-use LUTs extracted by the representative data extracting section 452. Data in one (1) row of the non-uniformity correction map in FIG. 12 corresponds to one (1) correction-use LUT. Further, the non-uniformity correction map has the identification numbers 1 through 256 assigned to the respective correction-use LUTs. That is, the non-uniformity correction map is a collection of the correction-use LUTs and represents correspondences between the correction-use LUTs and their respective pieces of identification information.

The index map is the table illustrated in FIG. 13 representing correspondences between the individual pixels of the display section 14 and the identification numbers assigned to the correction-use LUTs having been extracted from the groups to which the respective pieces of adjustment value information for the individual pixels of the display section 14 belong.

That is, the identification of the identification numbers, which are assigned to the individual pixels, can be made on the basis of the index map in FIG. 13, and the identification of the correction-use LUTs corresponding to the identification numbers, can be made on the basis of the non-uniformity correction map in FIG. 12. By using these maps, it is possible to identify the correction-use LUT used for each of the pixels.

The map generating section 453 stores the generated non-uniformity correction map and index map in the storage section 26. At the time of non-uniformity correction, the non-uniformity correcting section 36 illustrated in FIGS. 1 and 21 makes access to the maps stored in the storage section 26 to identify a correction-use LUT for a pixel subject to correction, and then performs correction of a color component value of the pixel subject to correction by using the identified correction-use LUT.

For example, a pixel of a coordinate value (1, 1) in the index map illustrated in FIG. 13 (the topmost left pixel in FIG. 13) has the identification number "256" assigned thereto. For this pixel, the correction-use LUT corresponding to the identification number "256" is used out of the correction-use LUTs in the non-uniformity correction map illustrated in FIG. 12.

According to the embodiment described above, the pieces of adjustment value information to be stored in the storage section 26 are not all the pieces of adjustment value information determined for the pixels of the display section 14 (for example, 1920 pixels×1080 pixels), but 256 pieces of adjustment value information (correction-use LUTs). This arrangement is beneficial in reducing the amount of data.

According to the present embodiment, although corrections for the 1920×1080 pixels, for example, are handled with use of the 256 correction-use LUTs, it is possible to prevent the occurrence of an event that a proper adjustment value cannot be determined for each of the pixels. This is because, as described earlier, the correction-use LUT used for each pixel belongs to the group to which the most suitable adjustment value information for that pixel belong, and therefore has a high degree of similarity to (i.e. a small error from) the most suitable adjustment value information (i.e. a small error difference from the most suitable adjustment value information).

That is, the adjustment value obtained by using the adjustment value information determined as being similar by the clustering process can have a small error from the most suitable adjustment value. However, even with such a small error (for example, the obtained adjustment value is "+7" as contrasted with the most suitable adjustment value of "+8"), it is possible to perform correction to a value closely approximate to the most suitable adjustment value, and it is also possible to practically prevent a decreased accuracy of the correction because the small error is not recognizable by human's eyes.

Advantages of the Display Calibration System of Embodiment 1

Next, the following will describe advantages of the display calibration system 1 in accordance with the present embodiment. According to the present embodiment, in the reference data generating process using the reference device (s), measurements are performed on color patches of a first predetermined number (729 colors in FIG. 7A) to generate reference data that represents correspondences between RGB values and XYZ values, which correspondences are equal in number to the color patches of the first predetermined number. Meanwhile, in the calibration process performed for each of the display devices 10, measurements are performed on color patches of a second predetermined number (27 colors in FIG. 10), which is less than the first predetermined number. It should be noted that the color patches of the second predetermined number are contained in the color patches of the first predetermined number.

Specifically, the display calibration system 1 of the present embodiment has the memory 55 having stored therein the reference data that represents the correspondences between the RGB values (color component data) and the XYZ values (reference values) for the individual color patches of the first predetermined number (729 colors in FIG. 7A). The adjustment value calculating section 44 of the display calibration system 1 is configured to determine adjustment values respectively corresponding to the RGB values (color component data) of the color patches of the second predetermined number, on the basis of the reference data and the XYZ values obtained by the measurements on the individual color patches of the second predetermined number (27 colors in FIG. 10), which is less than the first predetermined number. This yields the effect of enabling a processing time required for the calibration process to be shorter than ever before while maintaining accuracy of the calibration process in an acceptable level.

Further, there is a tendency that, among systems of the same model, correspondences (characteristics) between the color component data (e.g. RGB values) and the measurement values (e.g. XYZ values) approximate each other. In view of this, in the present embodiment, coefficients used for matrix transformation of a measurement value (XYZ value), which is obtained by the measurement on the color patch during the calibration process, into a RGB value are determined from the correspondence between a RGB value (color information) and a XYZ value (reference value), which are represented by the reference data shared by the systems of the same model. Then, the measurement value (XYZ value) obtained by the measurement on the color patch is transformed into the RGB value by using the coefficients, and a difference between the RGB value obtained by the transformation and the RGB value of the color patch is calculated to determine the adjustment value. This enables transformation of the measurement value, which is measured during the calibration process, into the RGB value with accuracy, and it is therefore possible to maintain the accuracy of the calibration process. Especially, in the present embodiment, the calibration process is performed using the color patches of the second predetermined number (27 colors), which is less than the first predetermined number (the number of color patches used during the generation of the reference data; 729 colors), in a quest to reduce a processing time required for the calibration process. This arrangement does not reduce the number of pieces of information (729 colors) represented by the reference data, and therefore makes it possible to ensure the accuracy of coefficients used for transformation of a measurement value into a RGB value.

Incidentally, storing all of the pieces of correction data, which are generated for the individual pixels, in the storage section means storing enormous amount of data. This gives rise to a problem in cost. Especially, this problem has become significant in a recent situation in which display devices having a large number of pixels (e.g. full high-definition display and 4K2K display) are mainstream. In order to solve the problem, the present embodiment aims to reduce the amount of data to be stored by causing the storage section 26 to store therein, as the correction-use LUTs, the pieces of correction data having been selected by clustering, rather than by storing all of the pieces of correction data for all of the pixels. Further, the pieces of correction data are divided into groups by clustering. For this reason, the pieces of correction data which belong to the same group have a higher degree of similarity. Therefore, correction of a color component value for a pixel is performed, without using the correction data for that pixel, by using the correction data (correction-use LUT) that belongs to a group to which the correction data for that pixel belongs. This means that the correction is performed with use of another correction data having a similarity to (a small error from) the correction data for that pixel. This makes it possible to maintain the accuracy of correction with an error in insignificant level (with an error that is not recognizable by human's eyes), without the necessity to hold all of the pieces of correction data for all of the pixels in the storage section.

In the present embodiment, the correction data outputted by the adjustment value calculating section 44 is information that represents the adjustment values. Alternatively, the correction data may be information representing post-correction color component values (corrected color component values) obtained by correction with the adjustment values.

Further, in the above arrangement, the clustering process is performed to reduce the amount of adjustment value information (FIG. 11) to be stored. Alternatively, all of the pieces of adjustment value information determined for the individual pixels without the clustering process may be stored in the storage section 26 so that non-uniformity correction can be performed by using all of the pieces of adjustment value information determined for the individual pixels. It should be noted, however, that the method using the clustering process is beneficial in enabling reduction in amount of data to be stored.

Embodiment 2

Although not frequently, correction performed by the method described in Embodiment 1 can cause the following problem. That is, Embodiment 1 has described the arrangement in which the pieces of adjustment value information (see FIG. 11) for the individual pixels are divided into groups by the clustering process. In this arrangement, in a case where there is a large variability among the magnitudes of the adjustment values contained in one (1) piece of adjustment value information, an adjustment value applied to a certain piece of color information (R, G, B) can deviate greatly from a proper adjustment value as intended, depending upon a pixel.

This is caused under a situation, for example, such that in a case where there is a large variability among the magnitudes of the adjustment values contained in the adjustment value information, Euclidean distance between first adjustment value information and second adjustment value information is short although an adjustment value for a predetermined color component value in the first adjustment value information can be significantly different from an adjustment value for a predetermined color component value in the second adjustment value information. In this situation, due to a short Euclidean distance between the first adjustment value information and the second adjustment value information, the first adjustment value information and the second adjustment value information can be combined into the same group by the clustering process, and the first adjustment value information is extracted as the representative data of the group and then stored as the correction-use LUT. This results in a situation where first adjustment value information (correction-use LUT) is used for correction for a pixel for which the second adjustment value information has been obtained. In this situation, the adjustment value for the predetermined color component value deviates greatly from a proper adjustment value as intended.

Figure 14:
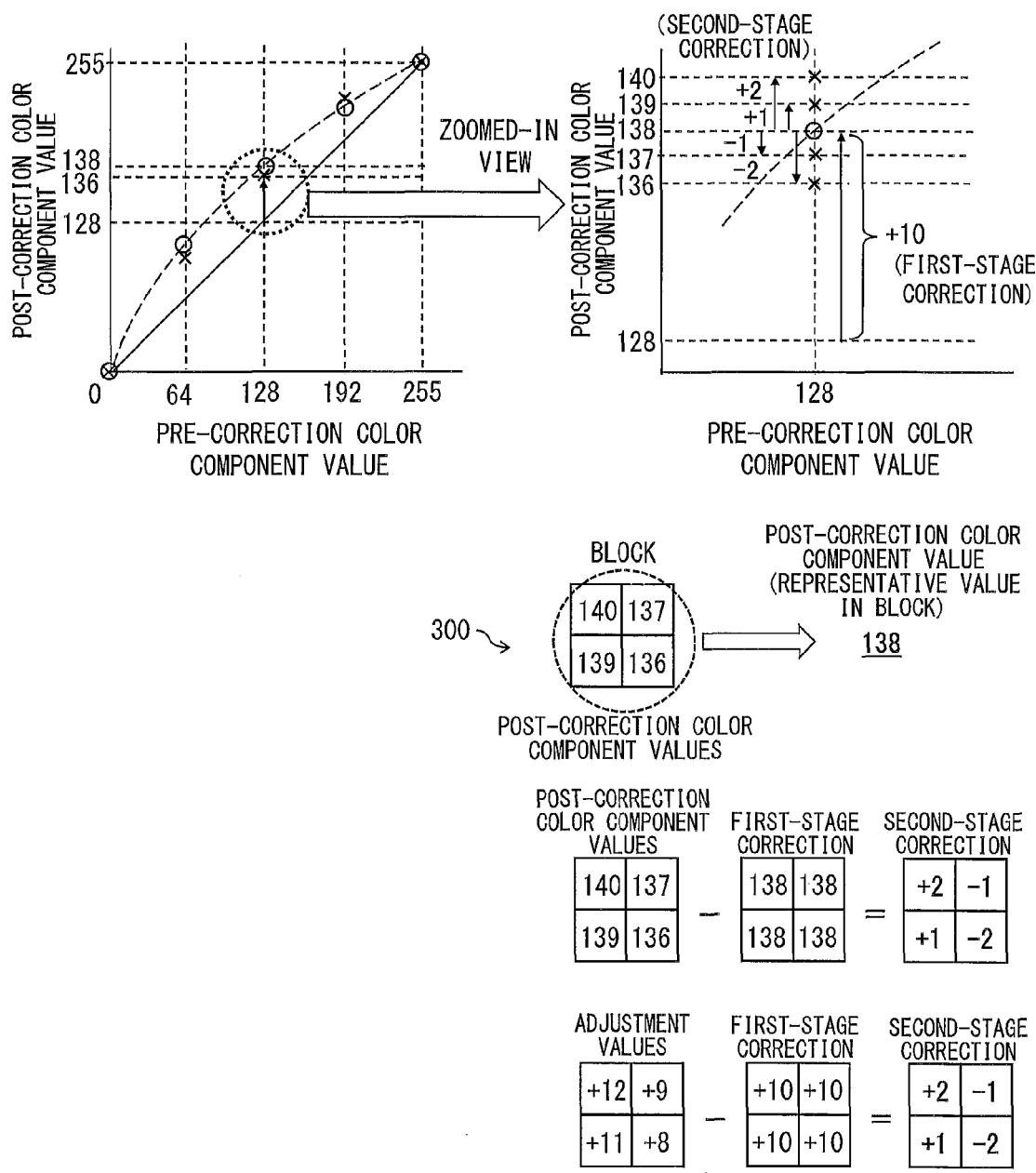
FIG. 14 is an explanatory view illustrating an example of two-stage correction performed in accordance with Embodiment 2.

In view of this, Embodiment 2 describes a two-stage correction method for preventing the occurrence of the above problem. FIG. 14 is an explanatory view illustrating an example of two-stage correction performed in accordance with the present embodiment.

In graphs illustrated in FIG. 14, a lateral axis indicates a pre-correction color component value, and a longitudinal axis indicates a post-correction color component value. Now, consider an example case where that a pre-correction color component value of 128 is corrected to 136. In the present embodiment, the pre-correction color component value is corrected in two stages, rather than corrected directly to 136. Specifically, the pre-correction color component value is corrected to 138 in a first-stage correction and then corrected to 136 by adjusting the color component value by −2 (136−138=−2) in a second-stage correction.

In this manner, an input color component value is not corrected directly to a desired corrected color component value. Instead, in the first-stage correction, correction is performed to make the input color component value close to the desired corrected color component value, so that correction can be performed with a small adjustment value (e.g. +3, +2, +1, 0, −1, −2, or −3) in the second-stage correction. Then, the second-stage correction may be performed in the same manner as the correction in Embodiment 1, so that pieces of adjustment value information are generated for the individual pixels, these pieces of adjustment value information are divided into groups by the clustering process, and the non-uniformity correction map and the index map are generated. This provides a small variability among the magnitudes of the adjustment values represented in the adjustment value information, which is generated for each pixel. This eliminates the occurrence of the problem that the adjustment value applied to a certain piece of color information (R, G, B) deviates greatly from a proper adjustment value as intended.

Next, the configuration of a display calibration system in Embodiment 2 will be described. A display calibration system 1 of Embodiment 2 is identical to the display calibration system of Embodiment 1, except that it includes a map outputting section 45a illustrated in FIG. 22, instead of the map outputting section 45 illustrated in FIGS. 2 and 21. The following will describe the map outputting section 45a, and members of Embodiment 2 that are identical in function to their corresponding members described in Embodiment 1 are not described here.

Figure 22:
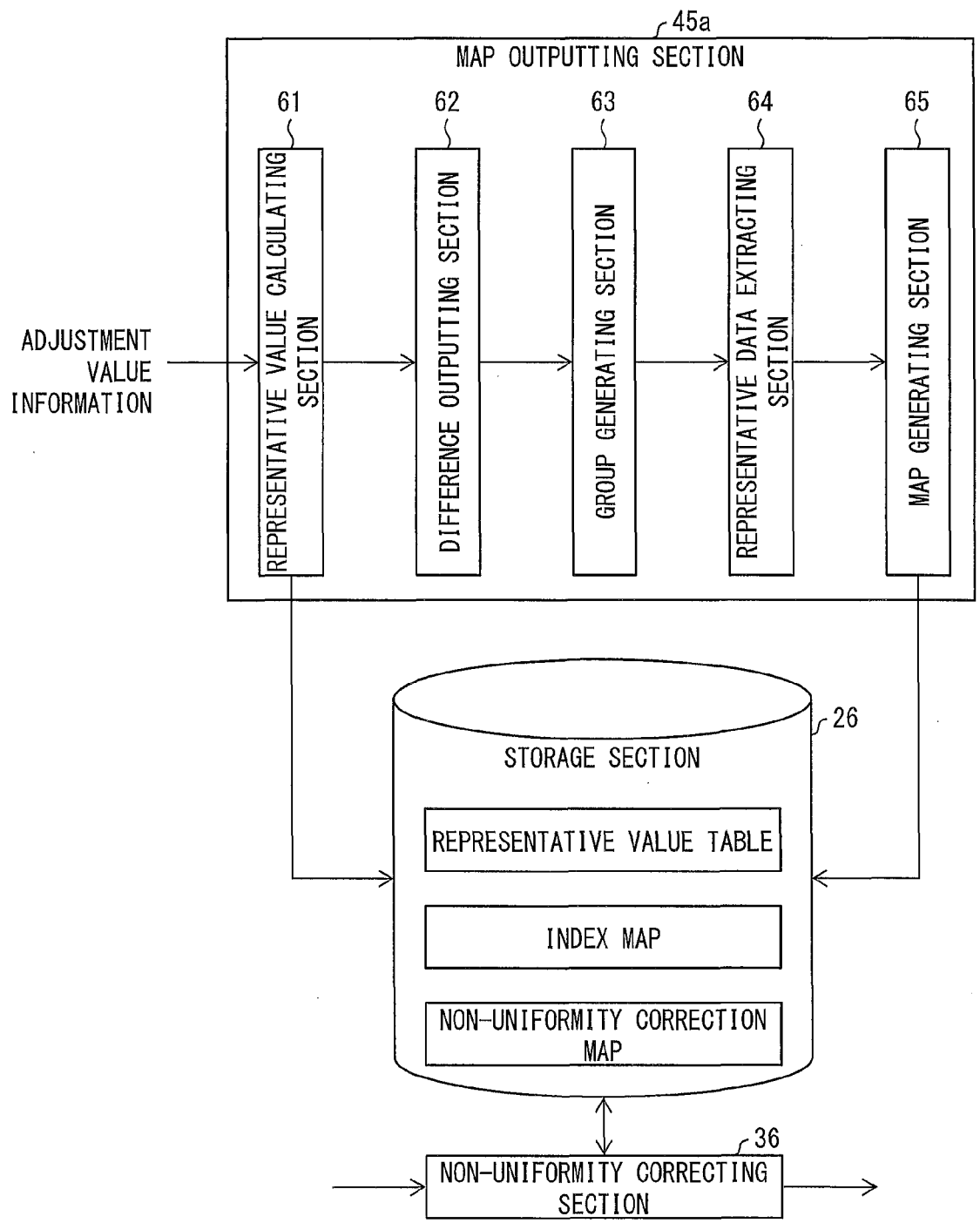
FIG. 22 is a block diagram illustrating the map outputting section in accordance with Embodiment 2.

As illustrated in FIG. 22, the map outputting section 45a includes a representative value calculating section 61, a difference outputting section 62, a group generating section 63, a representative data extracting section 64, and a map generating section 65.

First, as in Embodiment 1, the adjustment value calculating section 44 illustrated in FIG. 2 calculates, for each pixel, the adjustment values of the 27 types of color information set by any varying combinations of 0, 128, and 255, on the basis of the measurement values and the reference data, and then outputs the adjustment values. Subsequently, the adjustment value calculating section 44 inputs the adjustment value information representing the adjustment values of the 27 types of pieces of color information to the representative value calculating section 61.

The representative value calculating section (representative value information generating section) 61 illustrated in FIG. 22 divides all of the pixels of the display section 14 into blocks, as indicated by reference numeral 300 in FIG. 14, each of which consists of 4 pixels (2×2 pixels) adjacent to each other. That is, for the display section having 1920×1080 pixels, for example, 1920×1080/4 blocks are provided.

It should be noted that the number of pixels provided in one (1) block is not limited to 2×2 pixels. Alternatively, 2×3 pixels, 4×2 pixels, or others may be provided. Further, in a case where the measurement data illustrated in FIG. 3A is adjusted so as to be increased in number of pixels as illustrated in FIG. 3B, the pixels adjacent to each other as illustrated in FIG. 3B often have the same characteristics. For this reason, the setting of the number of pixels provided in one (1) block may be performed in consideration of a magnification factor (for example, if the number of pixels in one (1) block is set to 3×3 pixels, the number of pixels of the measurement data is increased threefold in row and column.).

Further, the representative value calculating section 61 determines, for each of the set blocks, representative values of corrected color component values (post-correction color component values), which are obtained on the basis of the adjustment values, of three types of color information representing achromatic color including gray out of 27 types of color information set by any varying combinations of 0, 128, and 255. Here, the three types of color information are (0, 0, 0), (128, 128, 128), and (255, 255, 255). For example, the block indicated by reference numeral 300 in FIG. 14 outputs, as a representative value, an average of the corrected color component values of the pixels provided in the block. The representative value, however, is not limited to an average. Alternatively, the representative value may be a maximum, a minimum, a mode, a median, or other value.

Then, regarding the three types of color information ((0, 0, 0), (128, 128, 128), (255, 255, 255)) representing achromatic color including gray, the representative value calculating section 61 generates, for each of the pixels or for each of the blocks, a representative value table (representative value information) representing representative values of the corrected color component values regarding R, G, B and then stores the generated representative value table in the storage section 26. An example of the representative value table is illustrated in FIG. 18A.

Figure 17:
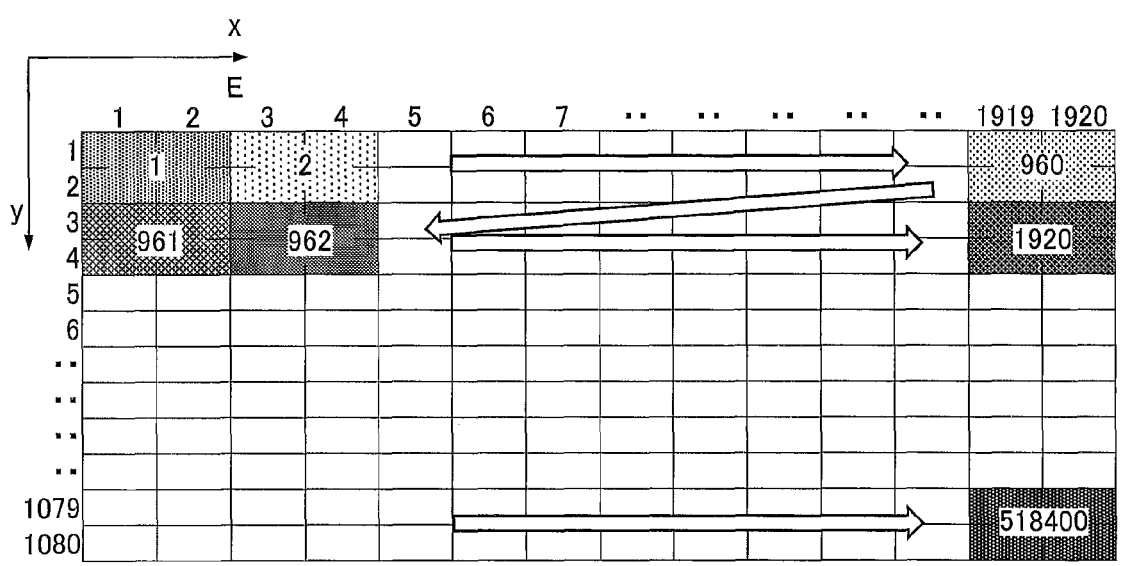
FIG. 17 is a view illustrating identification numbers of blocks each consisting of 2×2 pixels.

The representative value table illustrated in FIG. 18A shows, for each of the blocks, representative values of the corrected color component values regarding R, G, B of the three types of color information ((0, 0, 0), (128, 128, 128), (255, 255, 255)) representing achromatic color including gray. That is, the numbers 1 to 518400 shown in FIG. 18A are identification numbers assigned to the individual blocks as illustrated in FIG. 17. By these identification numbers, each of the blocks (pixels belonging to each of the blocks) are associated with the representative values. The representative value table illustrated in FIG. 18A is used in the first-stage correction, which will be described later.

Next, the difference outputting section 62 illustrated in FIG. 22 will be described. The difference outputting section (difference data outputting section) 62 calculate, for each of the pixels of the display section 14, a difference between the representative value and the corrected color component value, which has been used for calculation of the representative value, regarding R, G, B of the three types of color information ((0, 0, 0), (128, 128, 128), (255, 255, 255)) representing achromatic color including gray. This difference is an ideal value of the adjustment value used in the second-stage correction.

The difference outputting section 62 further calculates a similar difference regarding color information (e.g. (0, 128, 255)) other than the three types of color information ((0, 0, 0), (128, 128, 128), (255, 255, 255)) representing achromatic color including gray, out of the 27 types of color information handled by the adjustment value calculating section 44.

Since the representative value of the color information (e.g. (0, 128, 255)) other than the three types of color information ((0, 0, 0), (128, 128, 128), (255, 255, 255)) representing achromatic color including gray has not been determined, the difference regarding that color information is calculated as follows. As for R=0 of (0, 128, 255), a difference is determined between the representative value of the R value's corrected value determined regarding (0, 0, 0) and the R value's corrected value determined regarding (0, 128, 255). As for G=0 of (0, 128, 255), a difference is determined between the representative value of the G value's corrected value determined regarding (128, 128, 128) and the G value's corrected value determined regarding (0, 128, 255).

Next, the group generating section 63 illustrated in FIG. 22 will be described. Through the processing performed by the difference outputting section 62, pieces of difference data (transformation-use data) are generated, for all of the individual pixels, representing difference values regarding all of the grid points (27 points) in FIG. 10 (the difference data corresponds to the adjustment value information illustrated in FIG. 11). Here, all of the pieces of difference data of all of the pixels of the display section 14 should be too enormous in amount to be stored.

In view of this, the group generating section 63 divides all the pieces of difference data of all of the pixels into 256 groups by performing the clustering process. The clustering process is performed in the same manner as that in Embodiment 1, and detailed explanation thereof is omitted here.

The representative data extracting section (representative difference data extracting section) 64 illustrated in FIG. 22 is a block configured to, for each of the groups generated by the group generating section 63, extract, as the correction-use LUT, a piece of difference data as a representative (referred to as "representative difference data") from the pieces of difference data belonging to that group. That is, the representative data extracting section 64 extracts, for each of the groups, a corresponding one of the pieces of difference data, which one corresponds to a centroid in the clustering process, as the representative difference data (transformation-use representative data) and determines the extracted difference data as the correction-use LUT to be held. Further, the differences supposed to be represented by the correction-use LUT are the adjustment values used in the second-stage correction.

The map generating section (correspondence information generating section) 65 is a block configured to generate the non-uniformity correction map (second correspondence information) and the index map (second correspondence information) in accordance with processing results obtained by the group generating section 63 and the representative data extracting section 64, wherein a combination of the non-uniformity correction map and the index map represents correspondences between the individual pixels of the display section 14 and the correction-use LUTs extracted from the groups to which the respective pieces of difference data of the individual pixels of the display section 14 belong. The non-uniformity correction map and the index map in Embodiment 2 are similar to those in Embodiment 1, and explanation thereof is therefore omitted here.

The map generating section 65 stores the generated non-uniformity correction map and the index map in the storage section 26. The non-uniformity correction map and the index map are used in the second-stage correction.

Next, non-uniformity correction performed by the non-uniformity correcting section 36 will be described. Upon receipt of a certain color component value, the non-uniformity correcting section 36, to begin with, performs the first-stage correction (coarse adjustment, first processing) with reference to the representative value table stored in the storage section 26. Specifically, in a case where an input color component value is identical to the value of the color information ((0, 0, 0), (128, 128, 128), and (255, 255, 255)) shown in the representative value table illustrated in FIG. 18A, the non-uniformity correcting section 36 reads a representative value associated with the input color component value from the representative value table and then outputs the representative value as a provisional corrected color component value (corrected color component value used in the first-stage correction).

On the other hand, in a case where the input color component value is a value of color information different from the color information ((0, 0, 0), (128, 128, 128), and (255, 255, 255)) shown in the representative value table illustrated in FIG. 18A, the non-uniformity correcting section 36 plots an arc-like line (dashed line) passing through representative values of the three points (0, 0, 0), (128, 128, 128), and (255, 255, 255) as illustrated in FIG. 14, detects a correspondence between the input color component value and the post-correction color component value by using the plotted line, and then outputs the post-correction color component value as the provisional corrected color component value.

If there is a concern that the use of the line plotted based on the three points (0, 0, 0), (128, 128, 128), and (255, 255, 255) could degrade the accuracy of the non-uniformity correction, the representative values of the corrected color component values regarding the pieces of color information (64, 64, 64) and (192, 192, 192) may be additionally calculated through the processing of the representative value calculating section 61 so that the line can be plotted based on the five points (This arrangement requires measurements on color patches representing (64, 64, 64) and (192, 192, 192) and calculations of adjustment values of (64, 64, 64) and (192, 192, 192)). Although the arc-like line can be plotted by using the three points, it can be difficult to plot the arc-like line by using the five points. In this case, the line can be determined by linear interpolation or spline interpolation.

The image data of the present embodiment is 8 bits of data, and its color component value therefore ranges from 0 to 255. In a case where the arc-like line is plotted as illustrated in FIG. 14, it is desirable that calculation is performed with accurate corrected color component values. The calculation may be continued even when a value of less than 0 or a value greater than 255 is obtained, and after the calculation is completed, the obtained value may be rounded to 0 to 255. With this arrangement, more accurate corrected color component values can be obtained for color component values close to 0 or 255. Further, even if the image data is 8 bits of data, the calculation may be performed with more than 8 bits (e.g. 10 bits or 12 bits), and a value obtained by the calculation is rounded to a 8-bit value before outputted.

After the first-stage correction (coarse adjustment) is performed as described above, the non-uniformity correcting section 36 performs the second-stage correction (fine adjustment, second processing). Specifically, the non-uniformity correcting section 36 specifies any one of the correction-use LUTs with reference to the index map and the non-uniformity correction map to correct the provisional corrected color component value, which has been obtained in the first-stage correction, to an intended corrected color component value by using the specified correction-use LUT.

More specifically, in a case where color information whose value is the same as the input color component value (RGB value) is included in the pieces of color information listed in the correction-use LUT, an adjustment value associated with the color information whose value is the same as the input color component value is read from the correction-use LUT, and then corrects the provisional corrected color component value by using the read adjustment value. On the other hand, in a case where color information whose value is the same as the input color component value (RGB value) is not included in the pieces of color information listed in the correction-use LUT, i.e. in a case where a value of color information other than the pieces of color information listed in the correction-use LUT is the input color component value, the non-uniformity correcting section 36 detects a plurality of grid points (FIG. 10) around the position corresponding to the input color component value in the grid in FIG. 10, and then performs interpolation by using the adjustment values of the detected grid points in consideration of their positional relations, thereby obtaining the adjustment value corresponding to the input color component. Then, the non-uniformity correcting section 36 corrects the provisional corrected color component value, which has been obtained by the first-stage correction, to an intended corrected color component value by using the determined adjustment value.

According to the above arrangement, the first-stage correction subjects the input color component value to coarse adjustment on a block-by-block basis to a provisional corrected color component value, and the second-stage correction subjects the provisional corrected color component value to fine adjustment on a pixel-by-pixel basis to an intended corrected color component value. This enables not only decreasing (a) the number of times of measurements required for the correction of display non-uniformity and (b) the amount of data required for the correction of display non-uniformity, but also realizing correction with a high degree of accuracy.

It should be noted that even in the first-stage correction, the non-uniformity correction map (FIGS. 15A and 15B) and the index map (FIG. 16), instead of the representative value table illustrated in FIG. 18A, can be generated and used in a similar manner to those in the second-stage correction. Here, FIG. 15A illustrates the non-uniformity correction map for three types of color information and shows adjustment values of three types of color information, as an example, (0, 0, 0), (128, 128, 128), and (255, 255, 255). FIG. 15B illustrates the non-uniformity correction map for five types of color information and shows adjustment values of five types of color information, as an example, (0, 0, 0), (64, 64, 64), (128, 128, 128), (192, 192, 192), and (255, 255, 255). Further, the non-uniformity correction map for nine types of color information can be prepared only by increasing the number of pieces of data in row in FIG. 15A or FIG. 15B to 27 pieces (9×3 colors (R, G, B)=27).

This makes it possible to reduce the amount of data to be stored, as compared with the case where the representative value table illustrated in FIG. 18A is used. However, since three or five types of target color information (RGB value) are subject to the correction, the use of the representative value table, instead of the non-uniformity correction map and the index map, in the first-stage correction causes no problem in terms of data amount.

In the present embodiment, the corrected color component value (post-correction color component value) may be replaced by the adjustment value, or the adjustment value may be replaced by the corrected color component value. For example, assume that, for the color component value of 128, a desirable adjustment value for correction is "+12". In this case, correction is performed by the adjustment value of "+10" in the first-stage correction, and correction is performed by "+2" (a difference between the desirable adjustment value and the adjustment value used in the first-stage correction) in the second-stage correction.

Embodiment 3

Embodiment 3 is a modification example of Embodiment 2. In Embodiment 2, the first-stage correction (coarse adjustment) is performed with use of the representative value table illustrated in FIG. 18A, after which the fine adjustment (second-stage correction) is performed with use of the non-uniformity correction map and index map generated by the clustering process. However, even when the fine adjustment is omitted, pixel non-uniformity can be suppressed up to a point as long as the coarse adjustment is performed. Hence, an arrangement in which the coarse adjustment is performed alone without the fine adjustment may be adopted alternatively. In Embodiment 3, such an arrangement will be described.

In Embodiment 3, the map outputting section 45*a* is omitted in FIG. 22, and a representative value table generating section is provided instead. The representative value table generating section is a block configured to perform processing that is the same as the processing performed by the representative value calculating section 61 illustrated in FIG. 22. That is, the representative value table generating section receives the pieces of adjustment value information of all of the pixels from the adjustment value calculating section 44 during the calibration process, generates the representative value table illustrated in FIG. 18A with reference to the received adjustment value information, and then causes the representative value table to be stored in the storage section 26.

Figure 18B:
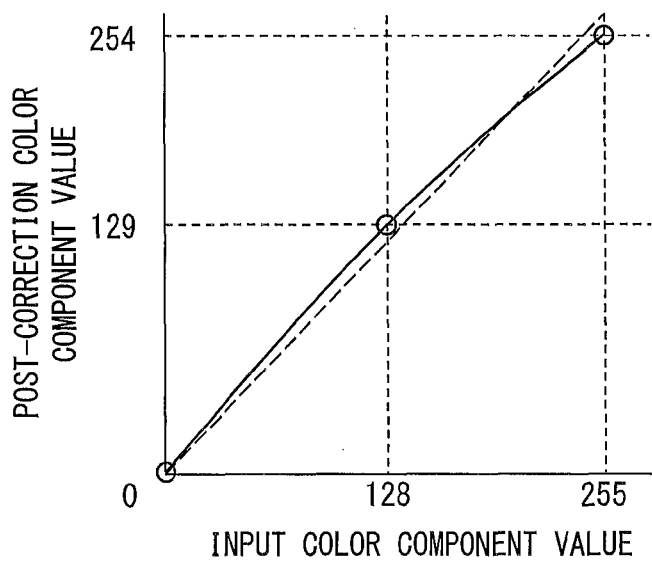
FIG. 18B is a graph, generated by plotting three points, illustrating a relation between input R values and corrected R values for the pixels of the block corresponding to the identification number 1 in FIG. 17.

Thereafter, the non-uniformity correcting section 36 performs corrections of color components of the individual pixels by using the representative value table stored in the storage section 26. This will be described with a specific example. For example, the following focuses on R values of a first block of pixels in FIG. 18A. When an input R value is 0, a corresponding output R value is 0. When the input R value is 128, the corresponding output R value is 129. When the input R value is 255, the corresponding output R value is 254 (see numerical values in boxes outlined in bold lines in FIG. 18A). As a result of interpolation performed based on these R values, a correction curve illustrated in FIG. 18B is obtained. In a similar manner, correction curves of all of the color components (R, G, B) are obtained for the first block. With this arrangement, color component corrections of the pixels belonging to the first block can be performed on the basis of the obtained correction curves. The above processing is performed for all of the blocks, and corrections are, in turn, performed for all of the pixels of the display section 14.

The correction of the present embodiment described above is performed in a manner such that the correction corresponding to the coarse adjustment (first-stage correction) described in Embodiment 2 is performed, while the correction corresponding to the fine adjustment (second-stage correction) described in Embodiment 2 is not performed. Even such a correction enables display non-uniformity to be suppressed up to a point. Hence, the fine adjustment using the clustering process is not necessarily performed as long as the coarse adjustment described in Embodiment 2 is performed. It should be noted, however, that display non-uniformity can be corrected with a much higher degree of accuracy if the fine adjustment is performed after the coarse adjustment.

Figure 18C:
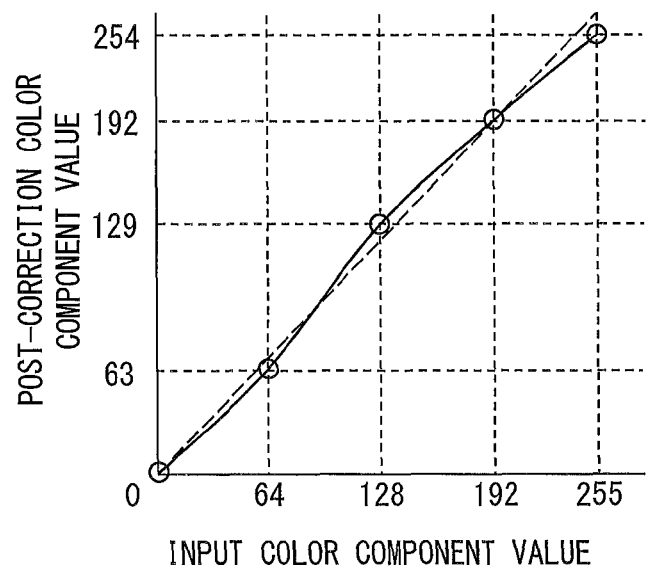
FIG. 18C is a graph, generated by plotting five points, illustrating a relation between input R values and corrected R values for the pixels of the block corresponding to the identification number 1 in FIG. 17.

Although the representative value table (FIG. 18A) used in Embodiment 3 or Embodiment 2 shows three types of color information, the representative value table may be arranged to show the representative values of the adjustment values of five types of color information by adding (64, 64, 64) and (192, 192, 192), or other combination of color information. Further, assume that a representative value table showing five types of color information (0, 0, 0), (64, 64, 64), (128, 128, 128), (192, 192, 192), and (255, 255, 255) is generated, and a correction curve for a R value of a certain block is determined by spline interpolation or the like. In this case, the determined correction curve is illustrated in FIG. 18C.

If there is a sufficient memory capacity, representative values of the adjustment values regarding 27 types of color information used during the measurements, instead of three or five types of color information may be held for each of the blocks as illustrated in FIG. 18A. With this arrangement, correction with a higher degree of accuracy is realized. In the above arrangement, the LUT (representative value table) is held on a block-by-block basis. This arrangement makes it possible to reduce the amount of data to be stored, as compared with the arrangement in which the correction-use LUT is held on a pixel-by-pixel basis.

Embodiment 4

The example case where the display section 14 is made up of one (1) display has been described in Embodiment 1. However, the display section 14 may be made up of multiple displays which are a plurality of displays. In the present embodiment, the processing performed for the display section 14 made up of multiple displays will be described.

Even in a case where the display section 14 is made up of multiple displays, the processing can be performed basically in a manner similar to the processing performed in the case where the display section 14 is made up of one (1) display. For this reason, the following will describe only differences from the processing performed in the case where the display section 14 is made up of one (1) display.

(Measurement)

For example, assume that the display section 14 is made up of four displays (two displays in column by two displays in row). In this case, measurement is performed by a non-contact color-measurement device under conditions where one and the same color patch is displayed on all of these four displays, and all of these displays are contained within a coverage of the color-measurement device. Such measurement is no different from the measurement performed in the case where the display section 14 is made up of one (1) display (since a non-contact type two-dimensional color analyzer is used as the color-measurement device, the four displays need only to be contained within the coverage (angle of view) of the color-measurement device).

(Processing of Measurement Data)

Figure 19A:
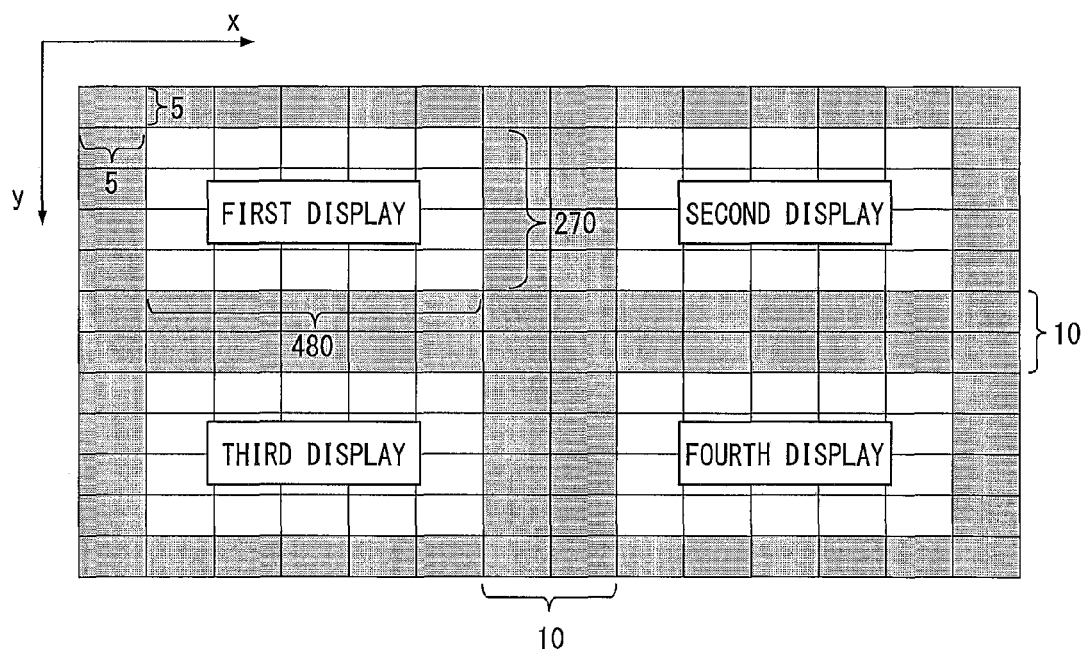
FIG. 19A is an explanatory view illustrating measurement data obtained by performing measurement on a display section which is made up of multiple displays.
Figure 19B:
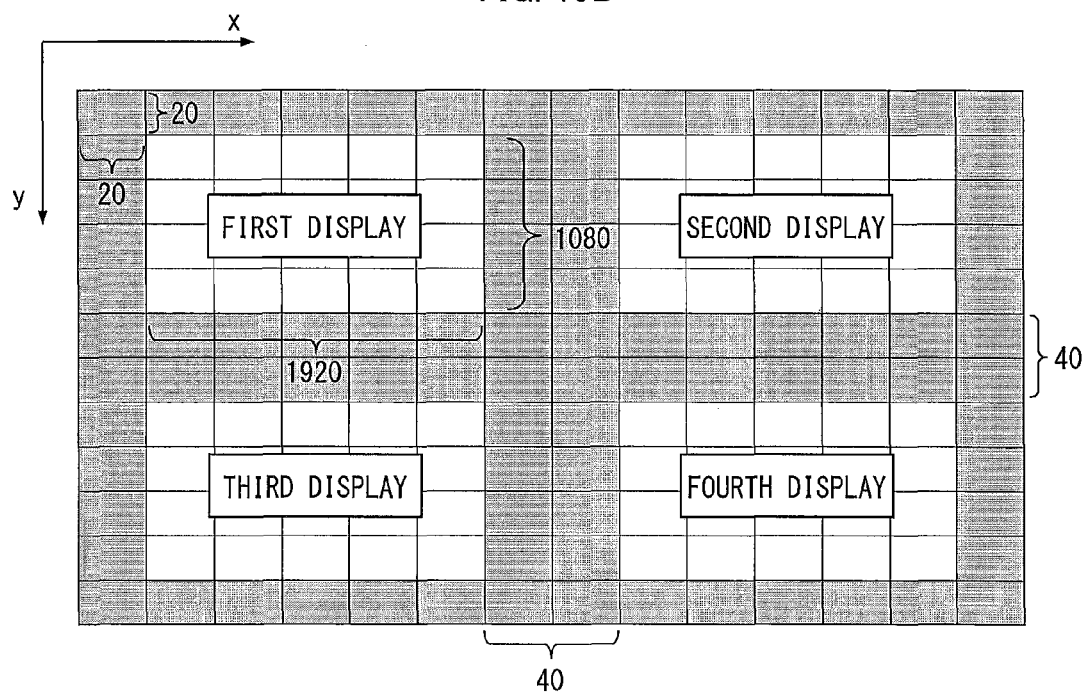
FIG. 19B is an explanatory view illustrating measurement data obtained by performing measurement on a display section which is made up of multiple displays, the measurement data being data obtained after the number of pixels is increased.

There is a bezel in a boundary between displays. This means that no pixels of the displays exist in a position corresponding to the bezel. Hence, since a black-filled (black-painted) part as illustrated in FIGS. 19A and 19B corresponds to the bezel, data excluding the black-filled part corresponds to the pixels of each of the displays. In view of this, it is necessary not only to adjust the size of the measurement data but also to extract the data excluding the bezel. Specifically, assume that measurement data is illustrated in FIG. 19A, and the number of pixels in a captured image corresponding to a panel of a first display, which is located at upper left position, of the four displays is 270 pixels (in vertical direction)×480 pixels (in horizontal direction). In this case, a display has 1080×1920 pixels as illustrated in FIG. 19B, the number of pixels of the measurement data is quadrupled, after which data corresponding to a valid portion (displayed image excluding the bezel) is extracted.

(Reference Data)

When the display section 14 is made up of multiple displays, the reference data used by one of the multiple displays may be identical to that used by the other display(s)

as long as all of these have the same characteristics. However, if the display section 14 includes displays having mutually different characteristics (displays of different models), there is a need to alter the reference data according to the characteristics of the displays. In this case, a plurality of pieces of reference data suitable for the individual displays are stored in such a manner that the individual displays are associated with the pieces of reference data. With this arrangement, even in a situation where displays of different characteristics coexist, it is possible to accurately perform non-uniformity correction.

The processes other than the processes detailed in the present embodiment can be performed even for a plurality of displays in the same manner as the processes performed for a single display, as long as the individual displays are properly associated with their respective measurement data and basic data.

According to the arrangement described above in Embodiment 4, the calibration process is performed using pieces of reference data conforming to the individual displays. With this arrangement, even when the display section 14 is constituted by multiple displays, it is possible to prevent the problem of noticeable display non-uniformity across display boundaries.

The above descriptions in Embodiments 1 through 4 assume that the display section 14 is a color image display device(s). As a matter of course, the arrangements described in Embodiments 1 through 4 are applicable to a monochrome image display device(s). In this case, luminance non-uniformity is corrected. It should be noted that a luminance value, not a color component value, of each color component is handled in the monochrome image display device. Hence, the adjustment values and corrected color component values are required to correspond to a luminance value.

Software Implementation Example

In the display device 10 in accordance with the above-described embodiments, at least the calibrating section 35 and the non-uniformity correcting section 36 may be realized by a logic circuit (hardware) provided in an integrated circuit (IC chip) or the like or may be realized by software as executed by a CPU (Central Processing Unit).

In the latter case, the display device 10 includes: a CPU that executes instructions of a program that is software realizing the foregoing functions; ROM (Read Only Memory) or a storage device (each referred to as "storage medium") storing the program and various kinds of data in such a form that they are readable by a computer (or a CPU); and RAM (Random Access Memory) that develops the program in executable form. The object of an aspect of the present invention can be achieved by a computer (or a CPU) reading and executing the program stored in the storage medium. The storage medium may be "a non-transitory tangible medium" such as a tape, a disk, a card, a semiconductor memory, and a programmable logic circuit. Further, the program may be supplied to or made available to the computer via any transmission medium (such as a communication network and a broadcast wave) which enables transmission of the program. It should be noted that an aspect of the present invention can also be implemented by the program in the form of a data signal embedded in a carrier wave which is embodied by electronic transmission.

CONCLUSION

Aspect 1 of the present invention is a display calibration system (display calibration system 1) including:

a correction data outputting section (adjustment value calculating section 44) configured to determine, for each pixel (for individual pixels) of a display section, correction data (their respective pieces of correction data) on a basis of (i) measurement values obtained by measurements on a plurality of color patches displayed on the display section (display section 14) subject to calibration and (ii) reference values preset with respect to pieces of color component data for displaying the color patches, the pieces of correction data each representing one of adjustment values and corrected color component values, both of which are applied to the pieces of color component data; and a first storage section (memory 55) configured to store therein reference data representing, for the color patches of a first predetermined number, their respective correspondences between the pieces of color component data and the reference values, the correction data outputting section obtaining, for the individual pixels of the display section, their respective pieces of correction data on a basis of the reference data and the measurement values of the color patches of a second predetermined number that is less than the first predetermined number, the respective pieces of correction data each representing one of adjustment values and corrected color component values with respect to the color component data of the individual color patches of the predetermined second number.

Even when the measurements on the color patches of the second predetermined number that is less than the first predetermined number are performed during the calibration process as in Aspect 1 of the present invention, it is possible to maintain accuracy of the calibration process in an acceptable level. Consequently, the display calibration system in accordance with Aspect of the present invention yields the effect of enabling a processing time required for the calibration process to be shorter than ever before while maintaining processing accuracy of the calibration process in an acceptable level.

In addition to the arrangement of Aspect 1, a display calibration system in accordance with Aspect 2 of the present invention includes:

a group generating section (group generating section 451) configured to divide all of the pieces of correction data obtained for the individual pixels into groups by performing a clustering process;

a representative correction data outputting section (representative data extracting section 452) configured to determine, for all of the groups, their representative pieces of representative correction data on a basis of all of the pieces of correction data belonging to their corresponding group;

a correspondence information generating section (map generating section 453) configured to generate correspondence information representing correspondences between the individual pixels of the display section and the respective pieces of representative correction data of all of the groups of the pieces of correction data generated for the individual pixels of the display section;

a second storage section (storage section 26) configured to store therein the correspondence information generated by the correspondence information generating section; and a non-uniformity correcting section (non-uniformity correcting section 36) configured to specify any one of the pieces of representative correction data, which one is associated with a pixel subject to correction, in accordance with the correspondence information, and then perform color component correction of the pixel subject to correction by using the specified representative correction data.

Storing all of the pieces of correction data, which are generated for the individual pixels, in the storage section means storing enormous amount of data. This gives rise to a problem in cost. Especially, this problem has become significant in a recent situation in which display devices having a large number of pixels (e.g. full high-definition display and 4K2K display) are mainstream. In this regard, the arrangement of Aspect 2 of the present invention eliminates the need to store all of the pieces of correction data for the individual pixels, while requiring storing the representative correction data in the storage section. This makes it possible to reduce the amount of data to be stored. Further, the pieces of correction data are divided into groups by the clustering process. For this reason, the pieces of correction data which belong to the same group have a higher degree of similarity. Therefore, according to Aspect 2 of the present invention, correction of a color component value for a pixel is performed, without using the correction data for that pixel, by using the representative correction data) that belongs to a group to which the correction data for that pixel belongs. This means that the correction is performed with use of the representative correction data having a similarity to (a small error from) the correction data for that pixel. This makes it possible to maintain the accuracy of correction with an error in insignificant level (with an error that is not recognizable by human's eyes), without the necessity to hold all of the pieces of correction data for all of the pixels in the storage section. Consequently, the display calibration system in accordance with Aspect 2 of the present embodiment enables preventing cost increase caused by significant increase in amount of data to be stored, while preventing a decreased accuracy of the correction.

A display calibration system in accordance with Aspect 2 of the present invention includes, in addition to the arrangement in Aspect 2, an arrangement such that the correspondence information includes:

(a) a first table representing correspondences between the pieces of representative correction data and their respective pieces of identification information; and (b) a second table representing correspondences between the individual pixels of the display section and the pieces of identification information of the pieces of representative correction data of all of the groups of the pieces of correction data generated for the individual pixels of the display section.

According to Aspect 3 of the present invention, the non-uniformity correcting section reads the identification information associated with the pixel subject to correction from the second table, reads representative correction data associated with the identification information, and then corrects a color component of the pixel subject to correction by using the read representative correction data. That is, storing the first table and the second table in the storage section eliminates the need to store the pieces of correction data for all of the pixels in the storage section This achieves reduction in amount of data to be stored.

Further, there is a tendency that, among systems of the same model, correspondences (characteristics) between the color component data (e.g. RGB values) and the measurement values (e.g. XYZ values) closely approximate each other. In view of this, the display calibration system in accordance with Aspect 4 of the present invention includes, in addition to any one of the arrangements in Aspects 1 to 3, an arrangement such that the correction data outputting section determines, with reference to the correspondences represented by the reference data, a transformation coefficient for transforming the measurement values into the color component data, and determines, as the adjustment value, a difference between the color component data for displaying a corresponding one of the color patches and post-transformation color component data to which the measurement values of the corresponding one of the color patches are transformed by the transformation coefficient. This enables transformation of the measurement value, which is measured during the calibration process, into the color component data (e.g. RGB value) with accuracy, and it is therefore possible to maintain the accuracy of the calibration process. Especially, in the present aspect, the calibration process is performed using the color patches of the second predetermined number, which is less than the first predetermined number (the number of color patches used during the generation of the reference data), in a quest to reduce a processing time required for the calibration process. This arrangement does not reduce the number of pieces of information represented by the reference data, and therefore makes it possible to ensure the accuracy of coefficients used for transformation of the measurement value into the color component data.

Aspect 5 of the present invention is a display calibration system (display calibration system 1) for generating, for individual pixels of a display section (display section 14), their respective pieces of correction data for correction of non-uniformity of the display section, the pieces of correction data each representing one of adjustment values and corrected color component values with respect to color component data, the display calibration system including:

a representative value information generating section (representative value calculating section 61) configured to (i) divide the pixels of the display section into blocks each including a plurality of pixels, (ii) determine, for all of the blocks, their respective representative values of the pieces of correction data of the individual pixels provided in each of the blocks, and then (iii) generate representative value information representing the representative values corresponding to one of the blocks and the pixels of the display section;

a difference data outputting section (difference outputting section 62) configured to generate, for all of the pixels belonging to their corresponding blocks, their respective pieces of difference data representing differences between the pieces of correction data and the representative values;

a group generating section (group generating section 63) configured to divide the pieces of difference data generated for the individual pixels of the display section into groups by performing a clustering process;

a representative difference data extracting section (representative data extracting section 64) configured to extract, for all of the groups, their respective pieces of representative difference data, on a basis of all of the pieces of difference data belonging to their corresponding groups;

a correspondence information generating section (map generating section 65) configured to generate correspondence information representing correspondences between the individual pixels of the display section and the respective pieces of representative difference data of all of the groups of the pieces of difference data generated for the individual pixels of the display section;

a storage section configured to store therein the representative value information and the correspondence information; and a non-uniformity correcting section (non-uniformity correcting section 36) configured to, with respect to a pixel subject to correction, read a corresponding one of the representative values from the representative value information, read a corresponding one of the representative difference data from the correspondence information, and then obtain the correction data by using the read representative value and representative difference data.

According to the arrangement in Aspect 5 of the present invention, after the pieces of data for the non-uniformity correction are determined for the individual pixels, all of the determined pieces of data are not stored, but reduction in the amount of data to be stored is achieved by performing the clustering process. Even with such an arrangement, it is possible to suppress the demerit of the clustering process (decrease in accuracy of the correction due to variability among the magnitudes of individual values contained in that data).

Note that each of the display calibration systems in accordance with the aspects of the present invention may be realized by a computer. In this case, the present invention also encompasses: a program for allowing a computer to serve as the display calibration system by causing the computer to operate as the foregoing sections provided in the display calibration system; and a computer-readable storage medium storing the program therein.

An aspect of the present invention is not limited to the descriptions of the Embodiments, but can be altered by a person skilled in the art within the scope of the claims. An embodiment derived from a proper combination of technical sections disclosed in different embodiments is also encompassed in the technical scope of the present invention. Moreover, a novel technical feature can be created by a combination of technical sections disclosed in these embodiments.

INDUSTRIAL APPLICABILITY

An aspect of the present invention is applicable to a display device and a multiple display system including an array of a plurality of display devices.

REFERENCE SIGNS LIST

1 Display calibration system
10 Display device
14 Display section
26 Storage section (second storage section)
35 Calibrating section
36 Non-uniformity correcting section
44 Adjustment value calculating section (correction data outputting section)
45 Map outputting section
45a Map outputting section
55 Memory (first storage section)
61 Representative value calculating section (representative value information generating section)
62 Difference outputting section (difference data outputting section)
63 Group generating section
64 Representative data extracting section (representative difference data extracting section)
65 Map generating section (correspondence information generating section)
451 Group generating section
452 Representative data extracting section (representative correction data outputting section)
453 Map generating section (correspondence information generating section)

The invention claimed is:

1. A display calibration system realized by a computer for generating, for individual pixels of a display circuitry, their respective pieces of correction data for correction of non-uniformity of the display circuitry, the pieces of correction data each representing one of adjustment values and corrected color component values with respect to color component data, the display calibration system comprising:
a representative value information generating section configured to (i) divide the pixels of the display circuitry into blocks each including a plurality of pixels, (ii) determine, for all of the blocks, their respective representative values of the pieces of correction data of the individual pixels provided in each of the blocks, and then (iii) generate representative value information representing the representative values corresponding to one of the blocks and the pixels of the display circuitry;
a difference data outputting section configured to generate, for all of the pixels belonging to their corresponding blocks, their respective pieces of difference data representing differences between the pieces of correction data and the representative values;
a group generating section configured to divide the pieces of difference data generated for the individual pixels of the display circuitry into groups by performing a clustering process;
a representative difference data extracting section configured to extract, for all of the groups, their respective pieces of representative difference data, on a basis of all of the pieces of difference data belonging to their corresponding groups;
a correspondence information generating section configured to generate correspondence information representing correspondences between the individual pixels of the display circuitry and the respective pieces of representative difference data of all of the groups of the pieces of difference data generated for the individual pixels of the display circuitry;
a storage device configured to store therein the representative value information and the correspondence information; and
a non-uniformity correcting circuitry configured to carry out (i) first correction of, with respect to a pixel subject to correction, reading one of the representative values from the representative value information which one corresponds to tone of the pixel subject to correction and (ii) second correction of reading one of the representative difference data from the correspondence information which one corresponds to the tone of the pixel subject to correction and transforming the read representative value into the correction data by using the read representative difference data.

2. A non-transitory computer-readable storage medium storing therein a program for causing a computer to function as the display calibration system recited in claim 1, the program causing the computer to serve as the representative value information generating section, the difference data outputting section, the group generating section, the representative difference data extracting section, the correspondence information generating section, and the non-uniformity correcting circuitry.

* * * * *